(12) United States Patent
Abecassis et al.

(10) Patent No.: US 8,757,482 B2
(45) Date of Patent: *Jun. 24, 2014

(54) ATTENTION ECONOMY FOR ATTENTION TO MESSAGES, TASKS AND RESOURCES

(75) Inventors: David Abecassis, Mountain View, CA (US); Helen Cheng, Palo Alto, CA (US); Mark Phillips, Silver Creek Valley, CA (US); Leighton Read, Palo Alto, CA (US); Byron Reeves, Stanford, CA (US); Simon Roy, Los Altos, CA (US); Daniel Rubin, Atherton, CA (US)

(73) Assignee: Seriosity, Inc., Palo Alto, CA (US)

( * ) Notice: Subject to any disclaimer, the term of this patent is extended or adjusted under 35 U.S.C. 154(b) by 551 days.

This patent is subject to a terminal disclaimer.

(21) Appl. No.: 13/037,225

(22) Filed: Feb. 28, 2011

(65) Prior Publication Data
US 2012/0059744 A1 Mar. 8, 2012

Related U.S. Application Data

(63) Continuation of application No. 11/750,911, filed on May 18, 2007, now Pat. No. 7,918,388, which is a continuation of application No. 11/339,814, filed on Jan. 24, 2006, now Pat. No. 7,240,826.

(60) Provisional application No. 60/647,161, filed on Jan. 25, 2005, provisional application No. 60/705,726, filed on Aug. 3, 2005, provisional application No. 60/752,438, filed on Dec. 20, 2005.

(51) Int. Cl.
*G06F 7/00* (2006.01)

(52) U.S. Cl.
USPC .......................................................... 235/376

(58) Field of Classification Search
USPC .......... 235/380, 382, 383, 486, 487, 375, 376
See application file for complete search history.

(56) References Cited

U.S. PATENT DOCUMENTS

| 5,850,219 A | 12/1998 | Kumomura |
|---|---|---|
| 5,999,967 A | 12/1999 | Sundsted |

(Continued)

FOREIGN PATENT DOCUMENTS

| JP | 2003167828 | 6/2003 |
|---|---|---|
| WO | 2004084042 | 9/2004 |

OTHER PUBLICATIONS

Horvitz, E., et al., "Attention-Sensitive Alerting," Proceedings of the UAI '99, Conference on Uncertainty and Artificial Intelligence, Jul. 1999, Morgan Kaufmann Publishers: San Francisco. pp. 305-313, [online] [Retrieved on Mar. 14, 2007] Retrieved from the Internet<URL:http://research.microsoft.com/-horvitz/priorities.pdf>.

(Continued)

*Primary Examiner* — Thien M Le
(74) *Attorney, Agent, or Firm* — Raubvogel Law Office

(57) ABSTRACT

A centrally tracked artificial currency is provided within the context of an enterprise. This currency serves as a unit of account, medium of exchange, and store of value in a corporate "attention economy." Users (typically coworkers) in the enterprise are allotted a base number of currency units, which they can earn, exchange, and spend in a variety of ways to signal importance and "purchase" attention of others, or priority for other organization resources. In one aspect, senders of messages can specify an amount of currency to be associated with the message, so that recipients can see the specified amount before deciding whether to read the message. Once such a system is in use, it facilitates exchange of value based on user-created transactions regarding behavior, communication, resources, incentives, and priorities.

42 Claims, 17 Drawing Sheets

(56) References Cited

U.S. PATENT DOCUMENTS

| | | | |
|---|---|---|---|
| 6,484,197 | B1 | 11/2002 | Donohue |
| 6,654,791 | B1 | 11/2003 | Bates et al. |
| 6,832,245 | B1 | 12/2004 | Isaacs et al. |
| 7,099,443 | B2 | 8/2006 | Phillips et al. |
| 7,175,072 | B2 | 2/2007 | Krishnan et al. |
| 7,240,826 | B2 * | 7/2007 | Abecassis et al. ............ 235/376 |
| 7,918,388 | B2 * | 4/2011 | Abecassis et al. ............ 235/376 |
| 2002/0052855 | A1 | 5/2002 | Landesmann |
| 2005/0044153 | A1 | 2/2005 | Gross |
| 2005/0091326 | A1 | 4/2005 | Wang et al. |
| 2005/0144244 | A1 | 6/2005 | Landesmann |
| 2005/0198145 | A1 | 9/2005 | Davis |
| 2005/0198176 | A1 | 9/2005 | Landesmann |
| 2006/0004896 | A1 | 1/2006 | Nelson et al. |
| 2006/0178972 | A1 | 8/2006 | Jung et al. |
| 2008/0275873 | A1 | 11/2008 | Bosarge et al. |
| 2009/0187764 | A1 | 7/2009 | Astakhov et al. |

OTHER PUBLICATIONS

Horvitz, E., et al., "BusyBody: Creating and Fielding Personalized Models of the Cost of Interruption," Proceedings of CSCW, Conference on Computer Supported Cooperative Work, ACM Press, Nov. 2004, [online] [Retrieved on Mar. 14, 2007] Retrieved from the Internet<URL:http://research.microsoft.com/-horvitz/busybody_cscw.htm>.

Horvitz, E., et al., "Learning and Reasoning about Interruption," Proceedings of the Fifth ACM International Conference on Multimodal Interfaces, Nov. 2003, Vancouver, BC, Canada [online] [Retrieved on Mar. 14, 2007] Retrieved from the Internet<URL:http://research.microsoft.com/-horvitz/busybody_cscw.htm>.

Horvitz, E., et al., Models of Attention in Computing and Communications: From Principles to Applications, Communications of the ACM 46(3):52-59, Mar. 2003, [online] [Retrieved on Mar. 14, 2007] Retrieved from the Internet<URL:http://research.microsoft.com/-horvitz/cacm-attention.pdf>.

Van Dantzich, M., et al., "Scope: Providing Awareness of Multiple Notifications at a Glance," In: Proceedings of AVI 2002, ACM Conference on Advanced Visual Interfaces, Trento, Italy, May 22-24, 2002. ACM Press, [online] [Retrieved on Mar. 14, 2007] Retrieved from the Internet<URL:http://research.microsoft.com/-horvitz/scope.htm>.

Davenport, T.H., et al., The Attention Economy, 2001, 264 pages.

Denning, P.J., "Electronic Junk," Communications of the ACM, Mar. 1982, pp. 163-165, vol. 25, No. 3.

Koster, R., "Friday Feature—Economy Stats Apr. 30—Game Guides—Star Wars Galaxies Official Forums," [online] [Retrieved on Apr. 25, 2006] Retrieved from the Internet<URL:http://forums.station.sony.com/swg/boardftessage?board.id=game_guides&message.id=164799.

Kraut, R., et al., "Markets for Attention: Will Postage for Email Help?" Yale International Center for Finance, Aug. 2002, 12 pages.

Malone, T.W., et al., "Intelligent Information-Sharing Systems," Computing Practices, ACM, May 1987, pp. 390-402, vol. 30, No. 5.

McAdams, D., et al., "Internal Markets for Supply Chain Capacity Allocation," Sloan School of Management, Massachusetts Institute of Technology, Jun. 2005, pp. 1-30.

Turoff, M., "Information, Value, and the Internal Marketplace," Technological Forecasting and Social Change, 1985, pp. 357-373, No. 27.

Van Zandt, T., "Information Overload in a Network of Targeted Communication," Discussion Paper Series, Jun. 2001, 32 pages.

* cited by examiner

FIG. 14

ATTENTION ECONOMY FOR ATTENTION TO MESSAGES, TASKS AND RESOURCES

CROSS-REFERENCE TO RELATED APPLICATION

This patent application claims priority as a continuation of pending U.S. Utility patent application Ser. No. 11/750,911, for "Attention Economy for Attention to Messages, Tasks, and Resources", filed May 18, 2007, which claimed priority as a continuation of U.S. Utility patent application Ser. No. 11/339,814, for "Attention Economy for Attention to Messages, Tasks, and Resources", filed Jan. 24, 2006 and issued as U.S. Pat. No. 7,240,826, which claimed priority from the following provisional patent applications, the disclosures of which are incorporated herein by reference:

U.S. Provisional Patent Application No. 60/647,161, filed Jan. 25, 2005, for "Real-World Tasks in a Game Environment";

U.S. Provisional Patent Application No. 60/705,726, filed Aug. 3, 2005, for "Attention Economy"; and U.S. Provisional Patent Application No. 60/752,438, filed Dec. 20, 2005, for "Attention Economy for Attention to Messages, Tasks and Resources Within and Between Communities of Interest".

The above-listed utility and provisional patent applications, including, without limitation, pending U.S. Utility patent application Ser. No. 11/750,911, are incorporated herein by reference.

BACKGROUND

In the modern enterprise, information workers are inundated with electronic information, much of which is unnecessary and undesired. This information overload occurs because sending electronic information, usually through e-mail, has little cost. In general, each individual in the enterprise acts in his or her own interest when presented with a public good or resource, a phenomenon known in economic terms as "the Tragedy of the Commons." The cumulative effect of each person acting in their individual interest is that the common resource becomes over-used and loses value to the community, as is the case of an overgrazed common pasture. Thus, workers see the e-mail system as very low cost way of getting other's attention, regardless of the significance of their communication to others. As a result, most workers receive excessive amounts of e-mail from their coworkers (and from others), informing them of perhaps trivial developments. The attention of an organization's employees is a vital resource that has suffered from overuse due to the essentially unlimited availability of electronic mail. In addition to the problem of commercial spam, many information workers are overwhelmed by the volume of corporate spam: messages from within their own organization.

A system that allows a sender to signal the importance of an e-mail to the recipient is desired. Current systems do not address the Commons problem because the signals that are available (e.g., priority flags) do not impose a cost on the sender, and so the weight of their signal loses impact over time. In other words, the state of being flagged as a priority in current systems also carries little information to the recipient because it imposes no cost on the creator. Filters and intelligent agents have been proposed to deal with email overload but require a high level of user maintenance and cannot take into consideration the psychology of interpersonal relationships.

Resources other than an individual's attention within an organization are allocated by various mechanisms, many of which fail to operate efficiently. Important projects requiring use of a limited resource may wait in line behind low-priority ones because there is often no queuing mechanism other than first-come-first-serve, or based on other management policies. There is a need for a system that instantiates a more effective allocation mechanism based on the objective function of the organization. In short, a system that allows an individual to make demands on organization resources appropriate to his or her estimation of the possible gains for the organization would allow for increased efficiency and progress toward organization goals.

What is needed, therefore, is a system and method that allows or forces a sender of a message to reliably indicate the priority level of a message. The intended recipient can use these value-laden signals to then determine how much attention to devote to the message.

SUMMARY OF THE INVENTION

According to the techniques of one embodiment, a centrally tracked artificial currency is provided within the context of an enterprise. This currency serves as a unit of account, medium of exchange, and store of value in a corporate "attention economy." Alternatively, a currency can be used to measure, exchange, and reward behavior and other attributes of action in an enterprise. Users (typically coworkers) in the enterprise are allocated, by some method, a number of currency units (also referred to herein as "Serios"), which they can earn, exchange, and spend in a variety of ways to signal importance and "purchase" attention of others, or priority for other organization resources. For example, senders of email messages (or other types of message) can allocate a number of currency units to their messages. Recipients can decide whether or not to look at messages based, at least in part, on the number of currency units allocated to the messages. Recipients can even configure their email clients to filter out messages that have fewer than a designated number of currency units.

In one embodiment of the invention, currency allowance and exchange is processed through a central bookkeeping server that keeps track of all transactions and balances of individual workers. The currency can also be used by individuals to purchase, bid for, or use desired resources and assets within the organization, including, for example, the attention or time of other individuals, data, services, tools, and space. The currency can also be used when individuals interact with a computer or programs running on the computer or as part of the information exchanged between many computers even when an individual is not involved In one embodiment, the mechanisms through which currency is earned and spent can be carefully observed and engineered to drive desired behavior. In this embodiment, a system that creates liquidity of assets and currency allows for emergent behaviors to arise, which may ultimately benefit the organization when the organization's performance management systems have aligned individual with organizational objective functions. In this fashion, currency exchange becomes a voting mechanism by which individuals indicate relative value of the organization's resources, reflected in the resulting price, in that currency, of goods and services. Those skilled in the art will recognize that this invention can be used with filters and agent-based systems for managing electronic communication.

The present invention thus provides the following advantages:

Gives message senders a way to attach value to a message where a cost is imposed on the sender;

Gives message recipients a way to sort and/or filter messages based on value attached by senders;

Gives users (and administrators) a way to view their balance and the flow of value received and sent.

Establishes a currency to support markets for corporate and other resources

The features and advantages described in this summary and the following detailed description are not all-inclusive. Many additional features and advantages will be apparent to one of ordinary skill in the art in view of the drawings and specification hereof.

BRIEF DESCRIPTION OF THE DRAWINGS

The accompanying drawings illustrate several embodiments of the invention and, together with the description, serve to explain the principles of the invention.

FIG. 14 is a screen shot depicting an example of an alert box showing real time receipt of currency units.

One skilled in the art will recognize that these Figures are merely examples of the operation of the invention according to various embodiments, and that other architectures and modes of operation can be used without departing from the essential characteristics of the invention.

DETAILED DESCRIPTION OF EMBODIMENTS

For purposes of the description provided herein, the term "Serios" is used interchangeably with "currency units." For illustrative purposes, the following description sets forth the invention in terms of an attention economy currency; however, one skilled in the art will recognize that the present invention can be practiced with other types of currency, other media of exchange, and/or tangible or nontangible representations of value to an individual in an organization. For illustrative purposes, the following description sets forth the invention in terms of an information worker in a corporate environment; however, the invention can be used in connection with individuals in other environments communicating over any medium.

Software System

In one embodiment, the present invention is implemented as a software-based system that has the following attributes and features:

Participation is by invitation from one individual to another and may be voluntary.

The invitation offers a downloadable plug-in for email clients that facilitates sending, receiving and keeping track of currency units.

A bookkeeper establishes and maintains a collection of user accounts and facilitates transactions between them.

Users may earn rewards and reputation through individual or collaborative team tasks, and/or valuable exchange of currency units.

Users may view higher order metadata analysis of their transactions.

The email client plug-in has the following features:

Permits easy attachment of currency units during outgoing message composition via a user interface, as described below.

Transmits currency exchange data to the bookkeeper, as described below.

Displays the number of currency units attached to incoming mail in a field that can be used to sort and/or filter items in the inbox, as described below.

Displays the user's current currency unit balance from the bookkeeper server, as described below.

As described in more detail below, the bookkeeper has the following features:

Ability to securely authenticate, record, and store new user account and registration information.

Secure communication to receive information on currency exchanges among participants.

Secure website for participants to view their income statement and balance of trade with others in currency units.

Figure 4:
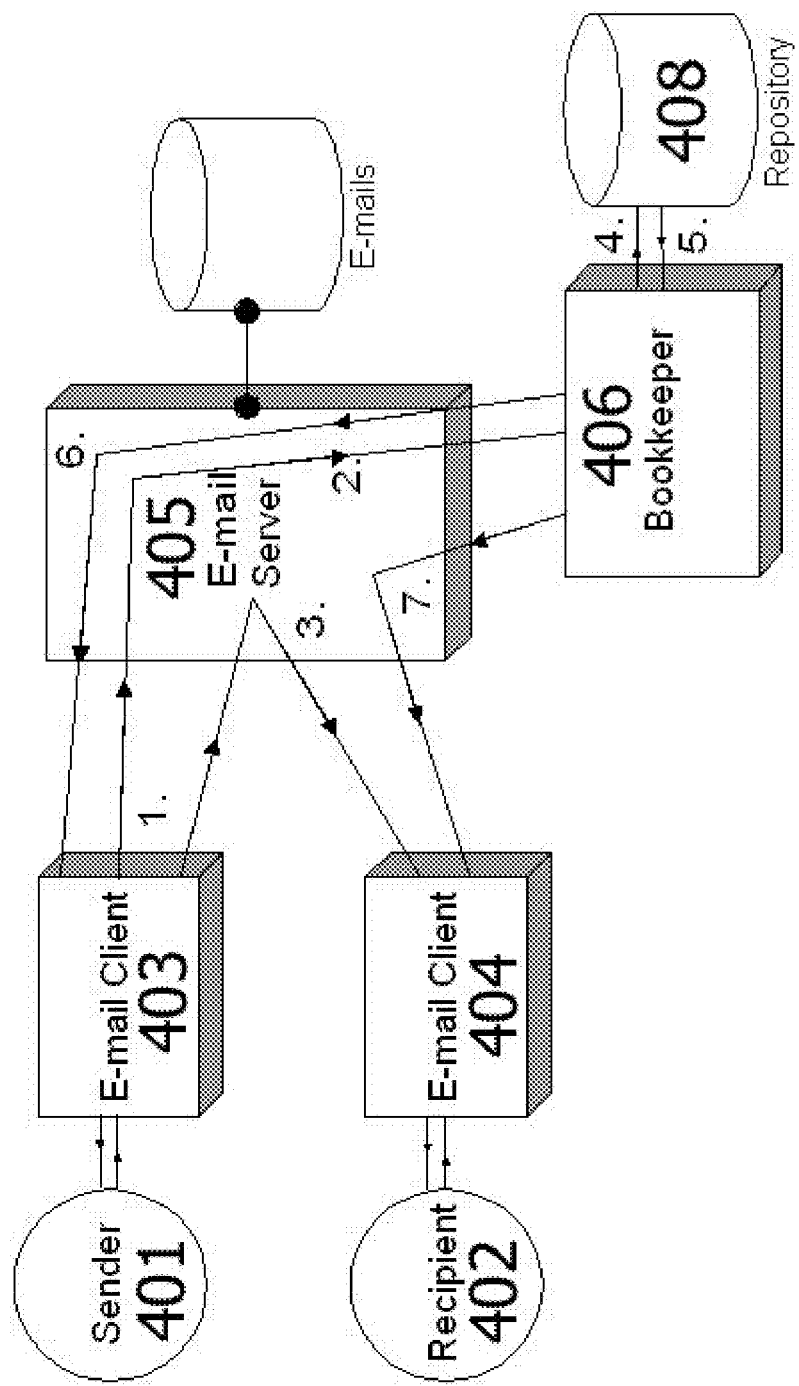
FIG. 4 is a block diagram depicting a system architecture and message trace according to one embodiment of the present invention.

Presentation of metadata on the currency units and exchanges, including analytics and graphical presentation of social metrics and econometrics that characterize the attention economy at the enterprise. Referring now to FIG. 4, there is shown a block diagram depicting a system architecture and message trace for implementing the present invention according to one embodiment. Sender 401 interacts with e-mail client 403 to send an e-mail message (or other type of message), addressed to recipient 402. E-mail server 405 handles the processing of e-mail messages and routes the message to e-mail client 404 associated with recipient 402. Bookkeeper 406 and repository 408 are used for managing the attention economy currency and transactions, as will be described in more detail below.

According to one embodiment of the present invention, currency is used as a means to value an electronic message's importance; a sender 401 determines how much he or she wishes to spend in an effort to purchase the recipient's 402 attention. Senders 401 of messages (such as e-mail, Instant Messages, SMS Text, or the like) can choose to attach these currency units to a message as an indicator of the message's relative importance. The number of currency units a sender 401 can attach is constrained by the number in his or her account and by sender's 401 desire to pay for others' attention to a particular message. Sender 401 may specify the number of units to be spent via any user interface mechanism, including for example drop-down menus, text input boxes, or other convenient means. For messages having multiple recipients 402, a different number of units can be allotted to each recipient 402, if desired. In one embodiment, a transfer is made of that number of units from sender's 401 account to each recipient's 402 account. The transfer can take place in response to any trigger event concerning the message, including for example:

when sender 401 sends the message;
when recipient 402 receives the message;
when recipient 402 reads the message;
when recipient 402 acknowledges the message; and/or
when recipient 402 performs some task associated with the message.

One skilled in the art will recognize that other trigger events can also be used.

In one embodiment, different amounts of currency can be specified for different trigger events. For example, one unit can be transferred upon sending, and another three units can be transferred when recipient 402 reads the message. Sender 401 of the message can specify the trigger events and the number of units for each trigger event.

In one embodiment, currency is transferred to central repository 408, or removed from circulation altogether, rather than being transferred to recipient 402. In yet another embodiment, some portion of the currency is transferred to central repository 408, or removed from circulation altogether, and the remaining amount is transferred to recipient 402. In this latter embodiment, the amount that is not transferred to recipient 402 can be referred to as a tax or a toll. Currency can be unified across organizations, if desired, so that one organization recognizes the currency and transactions managed by a bookkeeper of another organization.

In one embodiment, transfers are made by bookkeeper 406, which functions as an intermediate administrator. In one embodiment, bookkeeper 406 is implemented as a collection of computer executable modules, executing on e-mail server 405 or on another server (not shown). Bookkeeper 406 manages transactions of currency from one user to another (i.e. between sender 401 and receiver 402), as well as with repository 408. Upon receiving a message, recipient 402 can see sender's 401 assessment of the message's significance in terms of the number of units of currency attached to the message, as well as the units credited to his or her own account. The attached currency units will be transferred to recipient 402, whether recipient 402 decides to read the message or not. In another embodiment, the recipient 402 may not receive the currency until they open the email or act on some other trigger event.

Sender 401 will understand that a given recipient 402 will evaluate the importance of his or her message on several factors in addition to the number of units attached, including but not limited to sender's 401 name, subject, other recipients 402, and title of any attachments.

In one embodiment, bookkeeper 406 disburses currency to users, and is the mechanism through which transactions occur. Bookkeeper 406 is also capable of performing or assisting with statistical analysis based on transaction information and making this information visible to users. Bookkeeper 406 is adapted to disburse currency to users on any periodic (e.g., weekly) or event-driven basis.

Recipients 402 may also reply to messages with currency attached, where recipient 402 is using some portion of their currency balance to signal sender 401 the value recipient 402 placed on the original message or to convey appreciation or reward. If desired, a default number of currency units can be allocated to a reply (as specified in the user's preferences), although recipient 402 can modify this amount as desired for a particular reply. Used in this way, the system could deliver quantitative feedback to the originator and information to the community on the usefulness of communication between individuals.

When an e-mail is forwarded to other recipients, currency units can be allocated in the same way as a new message.

Currency is used as a signal of value understood by both sender 401 and recipient 402, where value is an indicator of importance, credibility, and priority. Recipient 402 can judge the message's value based on sender's 401 expenditure of a limited resource. Recipient 402 is able to compare the relative importance of various messages based on these criteria.

One way the value of currency units can be established is by allowing individuals to communicate "private treaty transactions" to bookkeeper 406 in which the units are exchanged for goods and service other than attention to messages. For example, using Serios, a manufacturing manager may "bid for" or "purchase" a serial position in any queue related to a scarce resource, such as time on a testing machine. Alternatively, the corporation may offer a perquisite, such as a preferred parking spot or time with the boss, for a number of currency units. Prizes can be auctioned or sold for currency units by supervisors, team leaders, or anyone in the organization to establish value for the currency or take units of currency out of the system. Currency exchange between individuals may emerge as a result of using this system. Financial services such as banking, currency exchange, lending, insurance, and futures markets may be facilitated by bookkeeper 406.

The invention is described herein, for illustrative purposes only, as an e-mail and/or desktop application that has or facilitates client-server interaction. A central or distributed server communicates with a desktop application that facilitates accounting when clients 403, 404 exchange electronic mail. In another embodiment, the architecture is based on peer-to-peer communication, rather than relying upon a central server. In another embodiment, a plug-in or add-on could be embedded within e-mail clients 403, 404 themselves rather than existing as an independent piece of software.

One skilled in the art will recognize that the present invention can also be implemented in connection with other communication media, including but not limited to: e-mail; instant messaging; telephone/voice; voice mail; voice transmitted over the Internet; paper correspondence; fax; telegraph; via mobile devices like mobile phones and personal data assistants; web-based mail; forums and message boards; internet relay chat; real time website-enabled chat; online shopping portals; to purchase, bid for, or give feedback regarding website resources and content; as a component in a platform or browser system; publishing systems such as wikis and blogs; in virtual worlds or environments; in games, including but not limited to electronic games, board games, and live action games; in face-to-face meetings via tokens or informal records, and the like, or any combination thereof.

Architecture

Messaging Client 403, 404

In one embodiment, client 403, 404 is an email software client programmed with particular features that facilitate implementation of the present invention or may be an already existing e-mail client product such as Microsoft Outlook, Lotus Notes, Netmail, Eudora Pro, or Mozilla Thunderbird with customized add-ons that help provide the functions described herein. Client 403, 404 may be a software process other than an email system, such as a collaboration environment, group shareware, and enterprise software, including for example enterprise resource planning (ERP) software, customer relationship management (CRM) software, interactive voice response (IVR) systems, and workflow management systems. Client 403, 404 may be a standalone application that performs standard message sending and receiving functions, which interfaces with a separate desktop application that bridges communication between client 403, 404 and bookkeeper 406 server. At the most basic level, client 403, 404 remains a tool for users to check and send electronic messages. It can include any of the following features, or it can communicate with a separate application that performs the following tasks: organizational features for scheduling, task-keeping, calendars, address books, contact lists, groupware, group collaboration tools, features to accommodate the receiving and display of news items, and organization and display features for media such as photographs, digital images, video, audio, and web pages. In addition, it may have additional features to accommodate web logs ("blogs") or journals, RSS feeds, character, avatar, or profile information, a bank account summary, text-based chat, voice over IP, corporate tasks and projects, markets, milestones, maps, search, language tools, news, audio, video, digital media, navigation tools, two-dimensional or three-dimensional graphical user interfaces and/or worlds, where the world is a computer-simulated environment in which users may interact with others, explore, socialize, achieve, compete, and perform tasks. Additional customizable add-ons or programmable modules to the message client can be swapped or installed. In one embodiment, this invention operates in a web-enabled environment where messages and currency transactions are initiated and recognized via a web browser or other thin client.

Client 403, 404 may be web-based, and will assume the same generic functionality as a software client 403, 404 counterpart even though implementation details may differ.

In one embodiment, client 403, 404 is able to communicate directly with bookkeeper 406 and access the user's account summary, which can display his or her currency balance and income statement. In another embodiment, client 403, 404 can communicate with a separate desktop application that mediates transactions between client 403, 404 and bookkeeper 406. In any case, currency that is spent or received can be immediately updated in real time to reflect an accurate account statement. It is also possible for users to access and view, in real time, lists of people who have credited currency units to themselves or others.

In one embodiment, a user can have more than one account. For example, he or she can have a different account for each of his or her email addresses or other handles for communication means.

As is well known in the art of message client software, users are able to sort and organize their messages based on several fields. In the case of email, these include the date received, sender 401 name, message subject, and priority flags, for example. Users are able to select which fields are visible, in what order they appear, and how messages are sorted based on those fields. According to one embodiment of the invention, an additional field is provided in the user interface presentation of an e-mail inbox (and in the user interface presentation of individual e-mail messages) that displays the number of currency units attached to a particular message.

Figure 1:
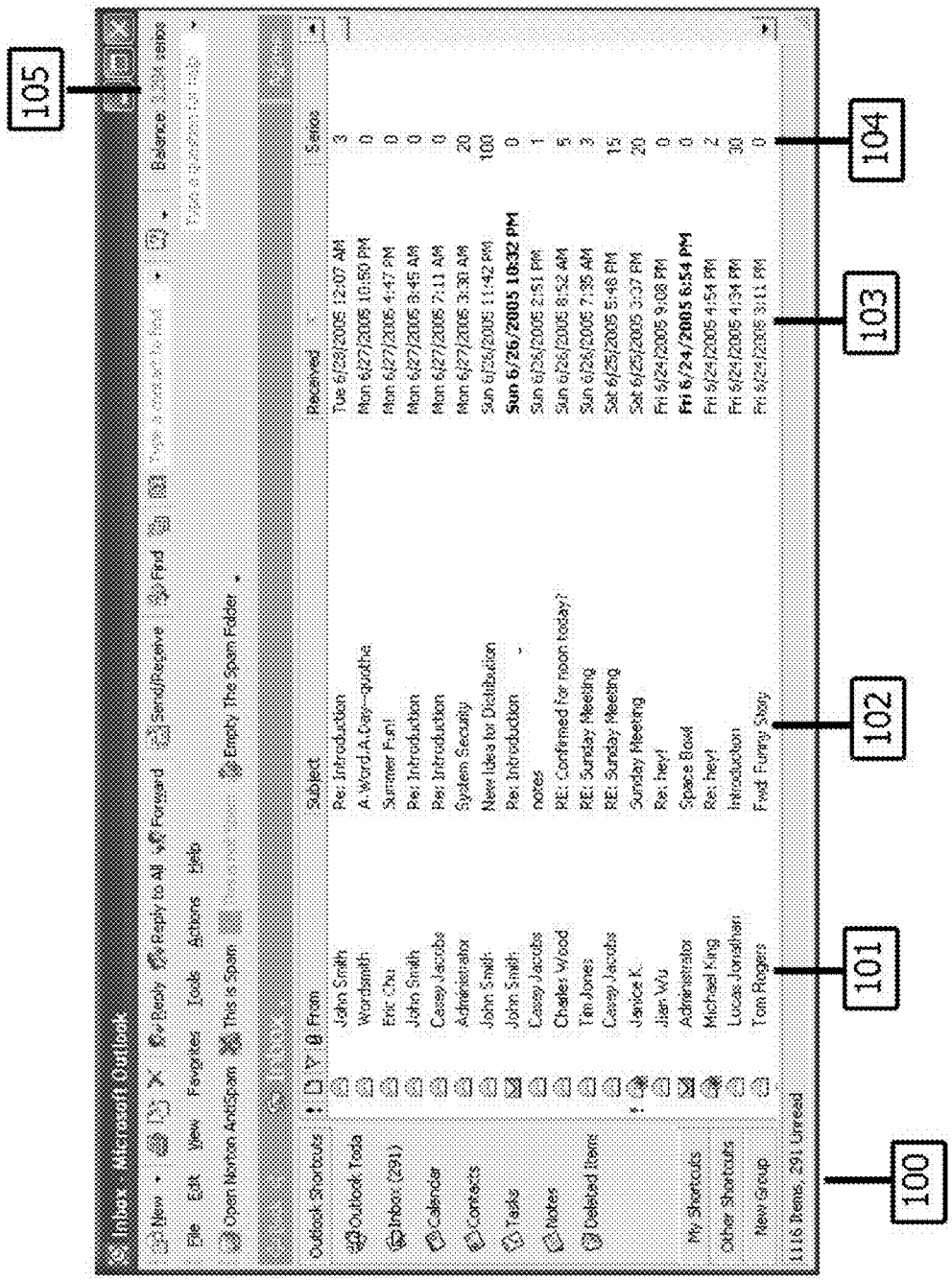
FIG. 1 is a screen shot depicting an example of a user interface for an e-mail client according to one embodiment of the present invention.

Referring now to FIG. 1, there is shown an example of the user interface 100 for such a Client 403, 404. The user interface 100 here illustrates the e-mail in-box. Columns are illustrated indicating sender 101, subject 102, received timestamp 103, and "Serios" 104 (In this figure and others, the units of currency are called "Serios", though any other name may be used as well.) The "Serios" column 104 indicates the number of currency units attached to the message. As with other fields, users can sort their messages by the number of units. Unlike other fields (e.g., priority), this value represents a valuation made by sender 401 on the importance of the message: a value that carries with it a correspondent cost to sender 401 and benefit to recipient 402. In the upper right hand corner is displayed the user's current currency balance 105, again in Serios.

Figure 16:
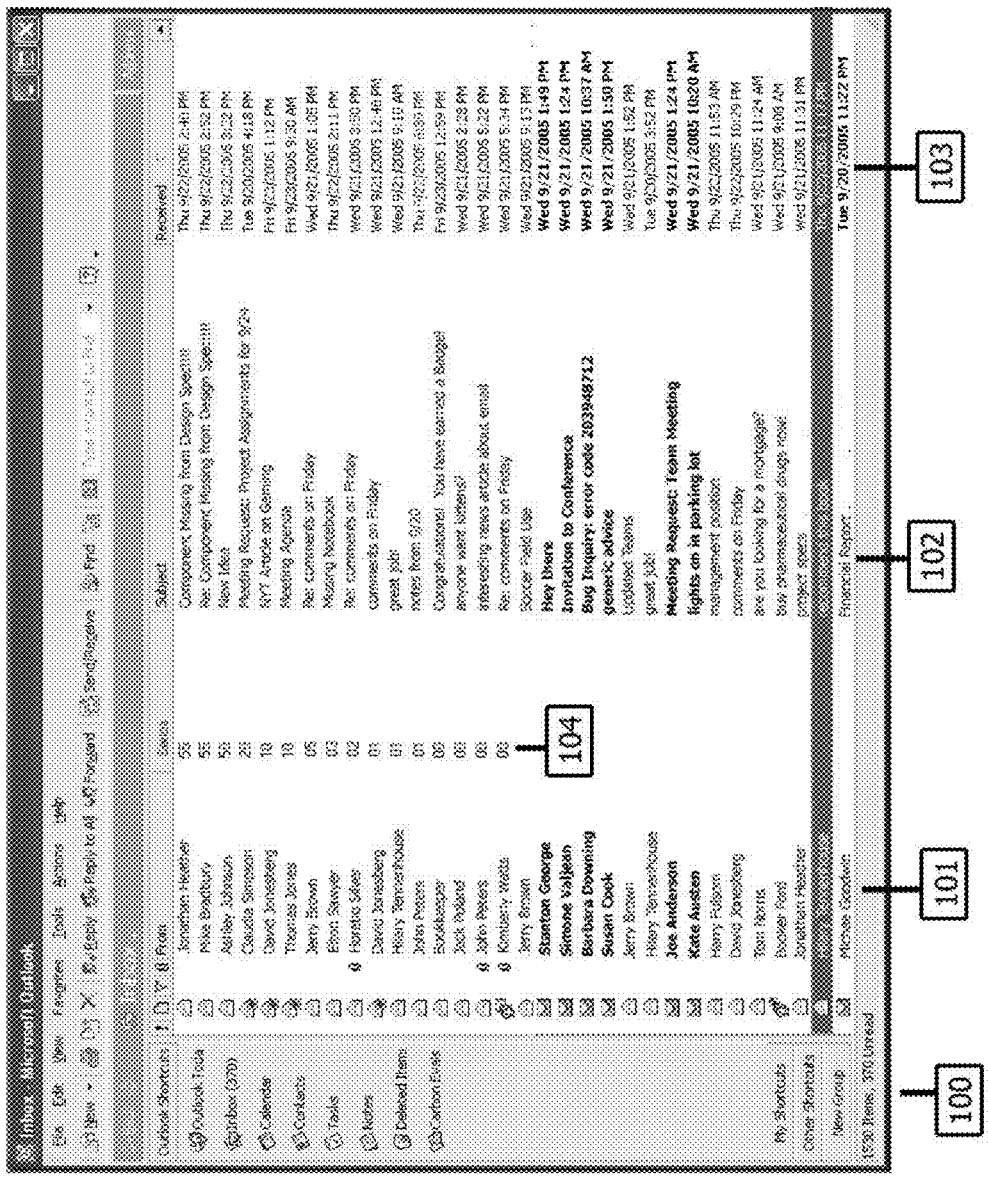
FIG. 16 is a screen shot depicting an example of a list of email messages in an inbox, sorted by ascending currency units.

Referring also to FIG. 16, there is shown an example of user interface 100 wherein messages are sorted according to the number of currency units 104 attached to each message. One skilled in the art will recognize that user interface 100 can also filter messages according to the number of currency units, so that messages having fewer than some specified amount are not shown, or are moved to a different folder or window.

Figure 2:
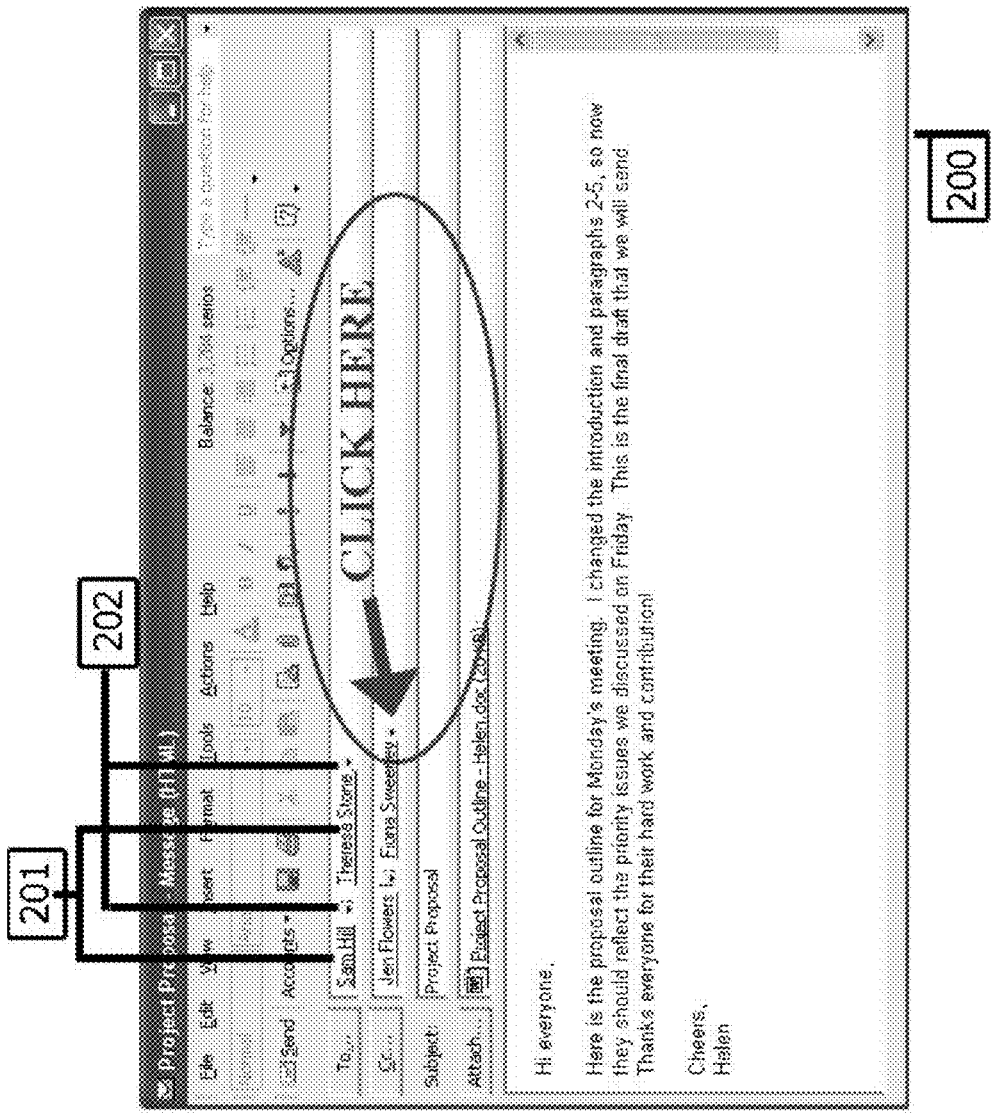
FIG. 2 is a screen shot depicting an example of a user interface element for specifying a number of currency units to be allocated for an e-mail message.
Figure 3:
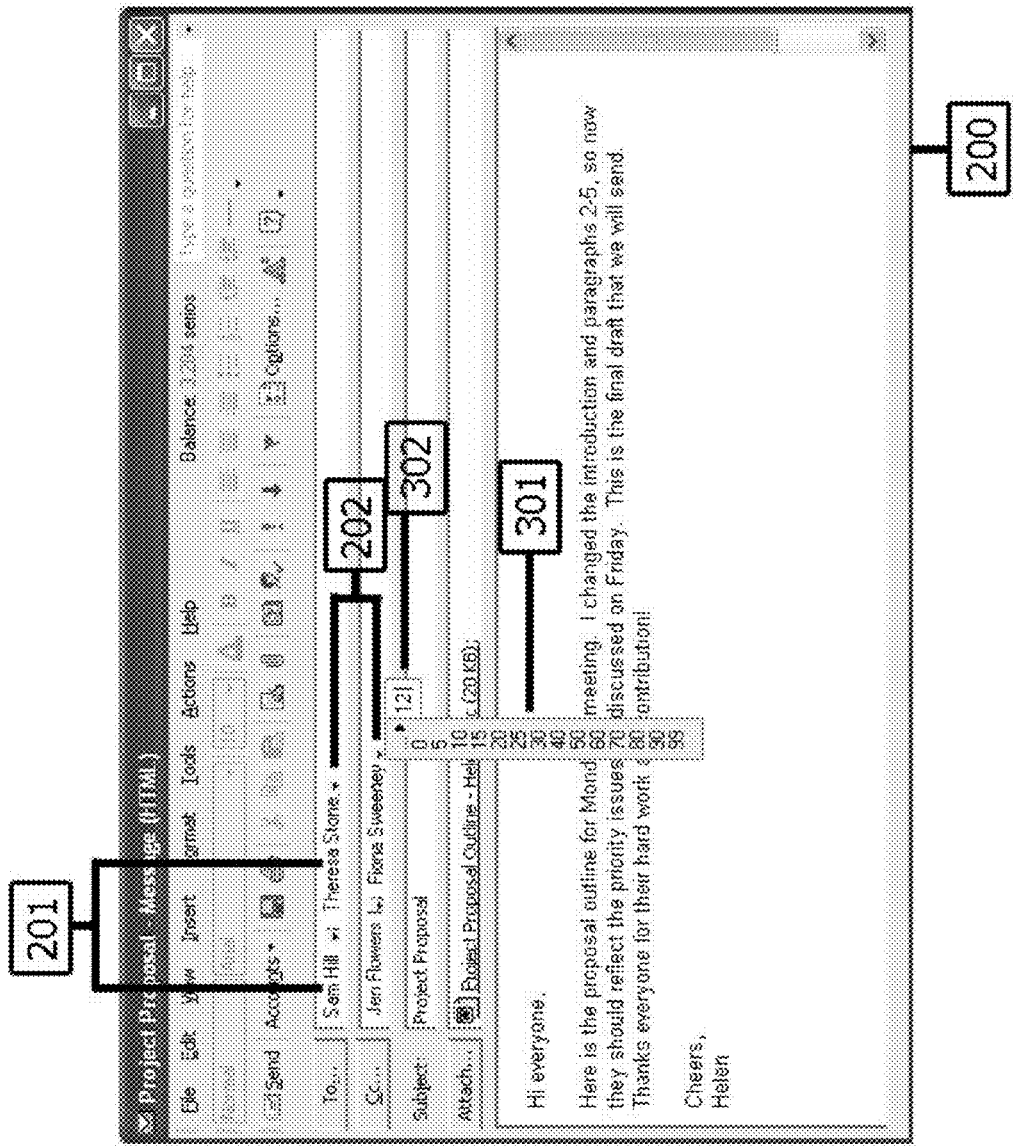
FIG. 3 is a screen shot depicting a drop-down menu for specifying a number of currency units to be allocated for an e-mail message.
Figure 11:
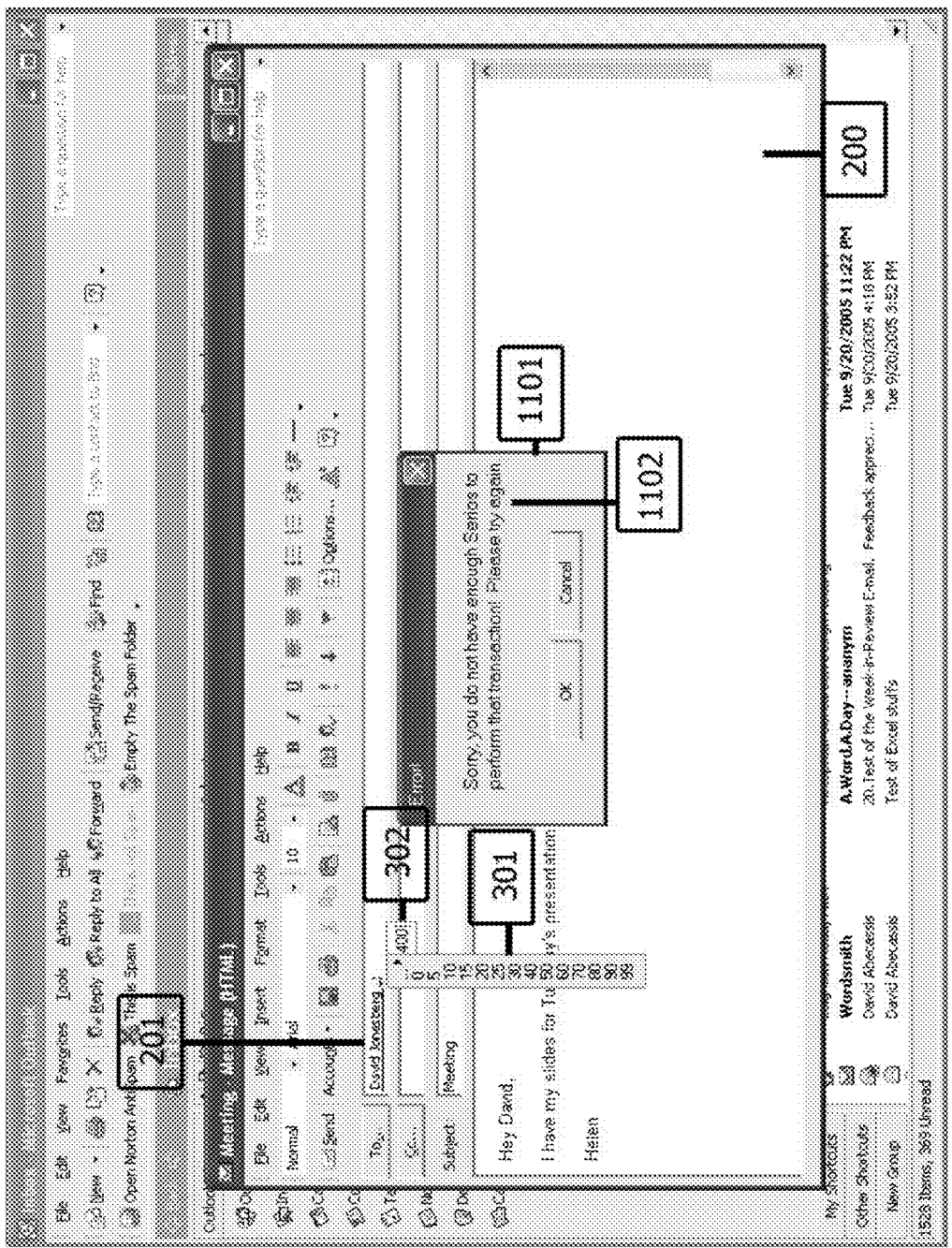
FIG. 11 is a screen shot depicting an example of a dialog box indicating that a sender does not have enough currency units to perform a requested transaction.

Referring now to FIGS. 2 and 3, there are shown screen shots depicting an example of an email composition window 200 including a mechanism, such as a drop-down menu or text input box, for specifying the number of currency units to be assigned to an email message. In FIG. 2, next to each recipient name 201 is a drop down menu element 202, which appears in the figure as a small triangle. Clicking on menu element 202 causes drop-down menu 301 to appear, as shown in FIG. 3. Drop-down menu 301 enables sender 401 to specify the number of currency units to be provided to the specific recipient 402 by selecting among the various values shown in menu 301. In one embodiment a text input box 302 also appears, allowing sender 401 to type in a value rather than selecting one from menu 301. Thus, sender 401 can differentially price the message according to recipient 402, paying a higher price in a bid for the attention of particular individuals (e.g., the CEO). Client 403, 404 performs necessary credit checks, through means of communication with bookkeeper 406, to ensure adequate funds exist for sender 401 to attach a requested number of units. If sender 401 attempts to allocate more currency units than are available, an error message is displayed. Referring also to FIG. 11, there is shown an example of a dialog box 1101 showing an error message 1102 indicating that sender 401 has attempted to allocate more currency units than are available.

Figure 12:
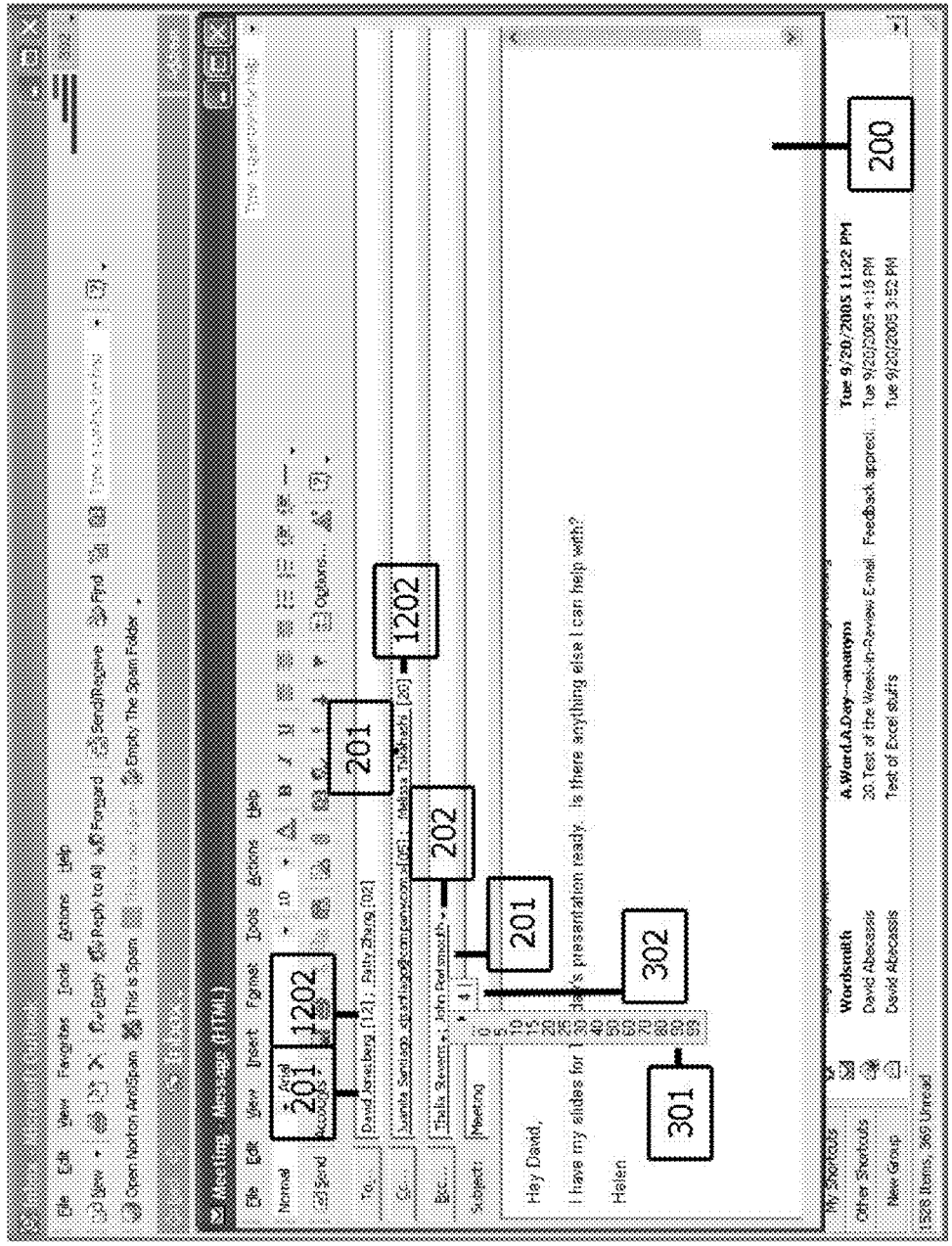
FIG. 12 is a screen shot depicting an example of a display showing the number of currency units allocated to each recipient of a message.

In one embodiment, for e-mails with multiple recipients, a menu element 202 appears for each recipient 402. Sender 401 can thereby specify a number of currency units for each recipient 402. If currency units are added to the last recipient 402 on the list, the designated amount is used for all recipients 402. Referring also to FIG. 12, there is shown an example of an email message composition window 200 wherein different numbers of currency units 1202 are shown alongside different recipient names 201.

Figure 13:
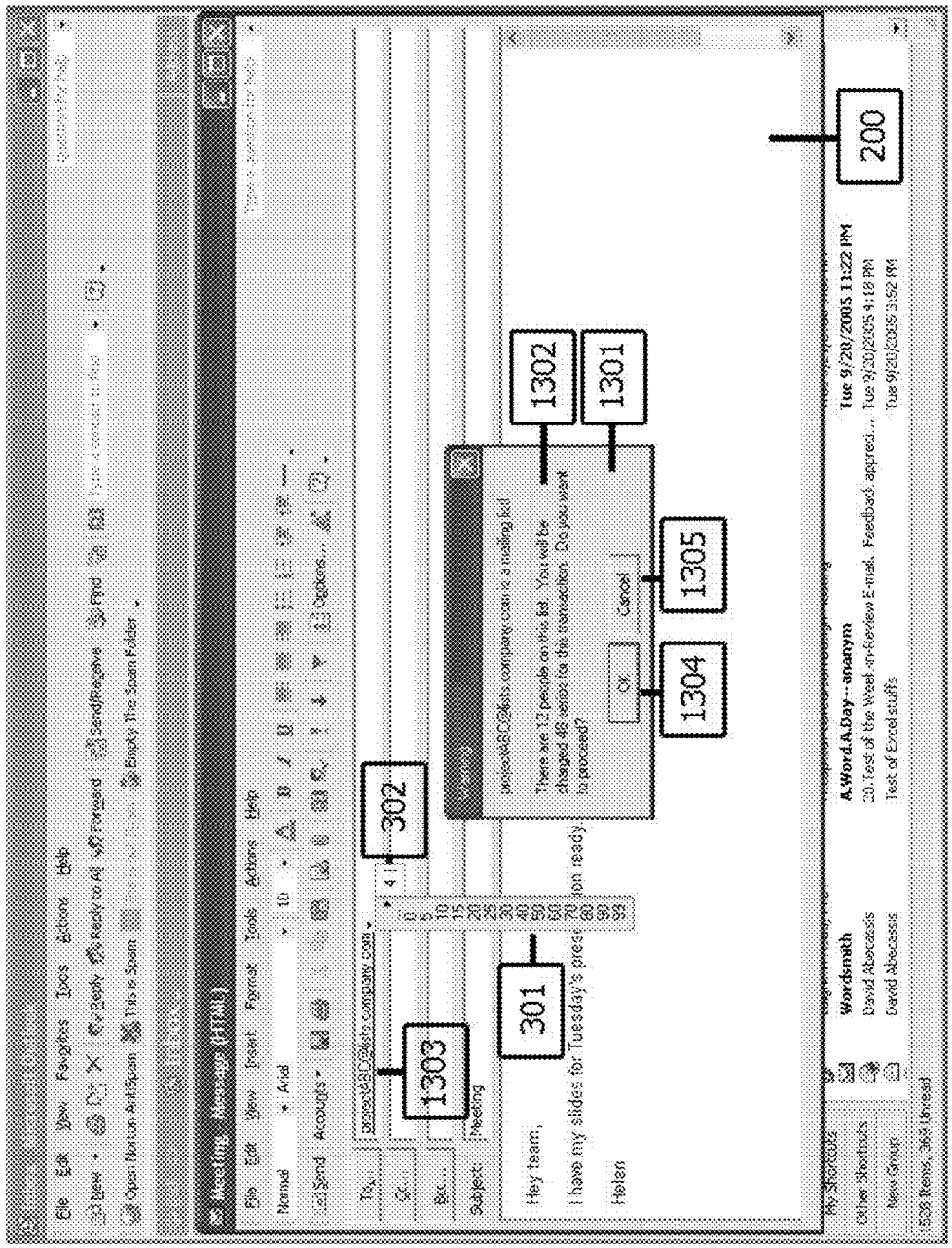
FIG. 13 is a screen shot depicting an example of a dialog box indicating a total number of currency units to be charged for a message to a group of recipients.

For mailing lists, a single currency unit allocation can be specified. This currency unit allocation is then used for each member of the list. In one embodiment, a calculation is performed to determine the total number of currency units, and sender 401 is given an opportunity to confirm that he or she is willing to expend the total as shown. Referring also to FIG. 13, there is shown an example of an email message composition window 200 wherein a sender 401 has indicated a mailing list 1303 as recipient. Dialog box 1301 includes a message 1302 informing sender 401 of the total number of currency units that will be charged. Sender 401 can click on OK button 1304 to proceed, or Cancel button 1305 to cancel.

In one embodiment, once currency units are allocated for recipients 402, the number of currency units allocated is displayed in parenthesis next to each recipient's 402 name or e-mail address.

Figure 6:
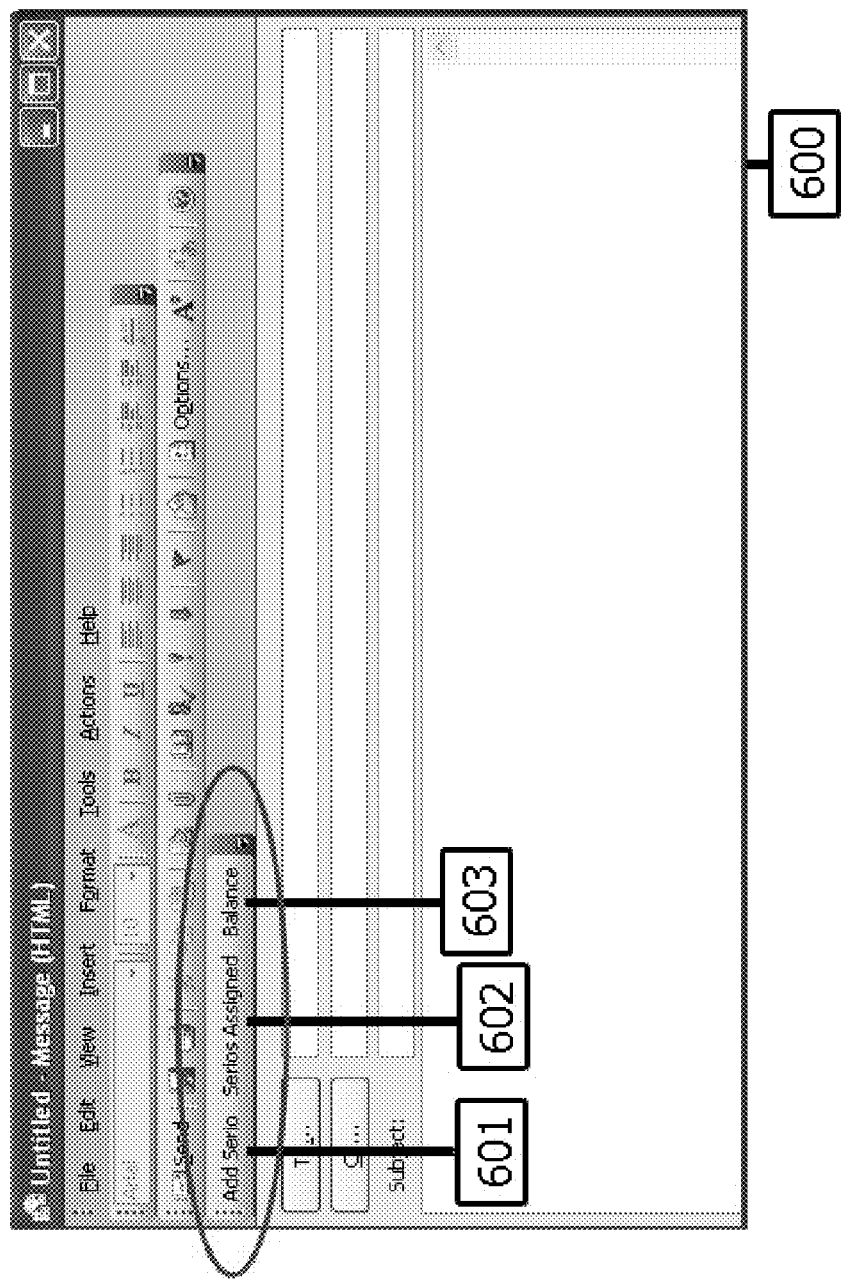
FIG. 6 is a screen shot depicting an example of a composition window for an e-mail client user interface according to one embodiment of the present invention.

Referring now to FIG. 6, there is shown an alternative example of a composition window 600 in which toolbar buttons 601, 602, 603 are provided for adding currency units to a message, determining the assigned number of currency units, and checking sender's 401 account balance, respectively.

Figure 7:
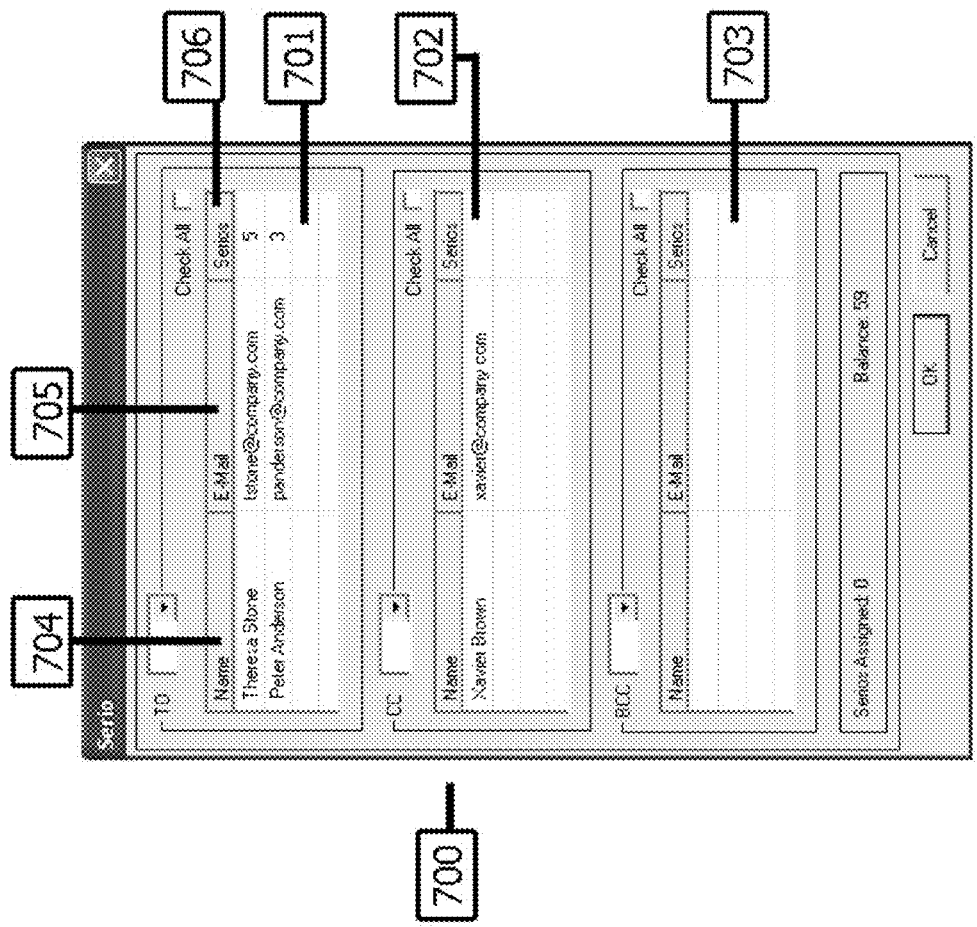
FIG. 7 is a screen shot depicting an example of an alternative user interface element for specifying a number of currency units to be allocated for an e-mail message.

Referring now to FIG. 7, there an example of an alternative user interface element 700 for specifying a number of currency units to be allocated for an e-mail message. Here, the user can see and/or specify addressees for an e-mail message, including "To" addressees 701, "cc" addressees 702, and "bcc" addressees 703. In each section, the user can see and/or specify the addressee's name 704 and email address 705, and can see and/or specify the number of currency units 706 to be allocated for each addressee.

Figure 14:
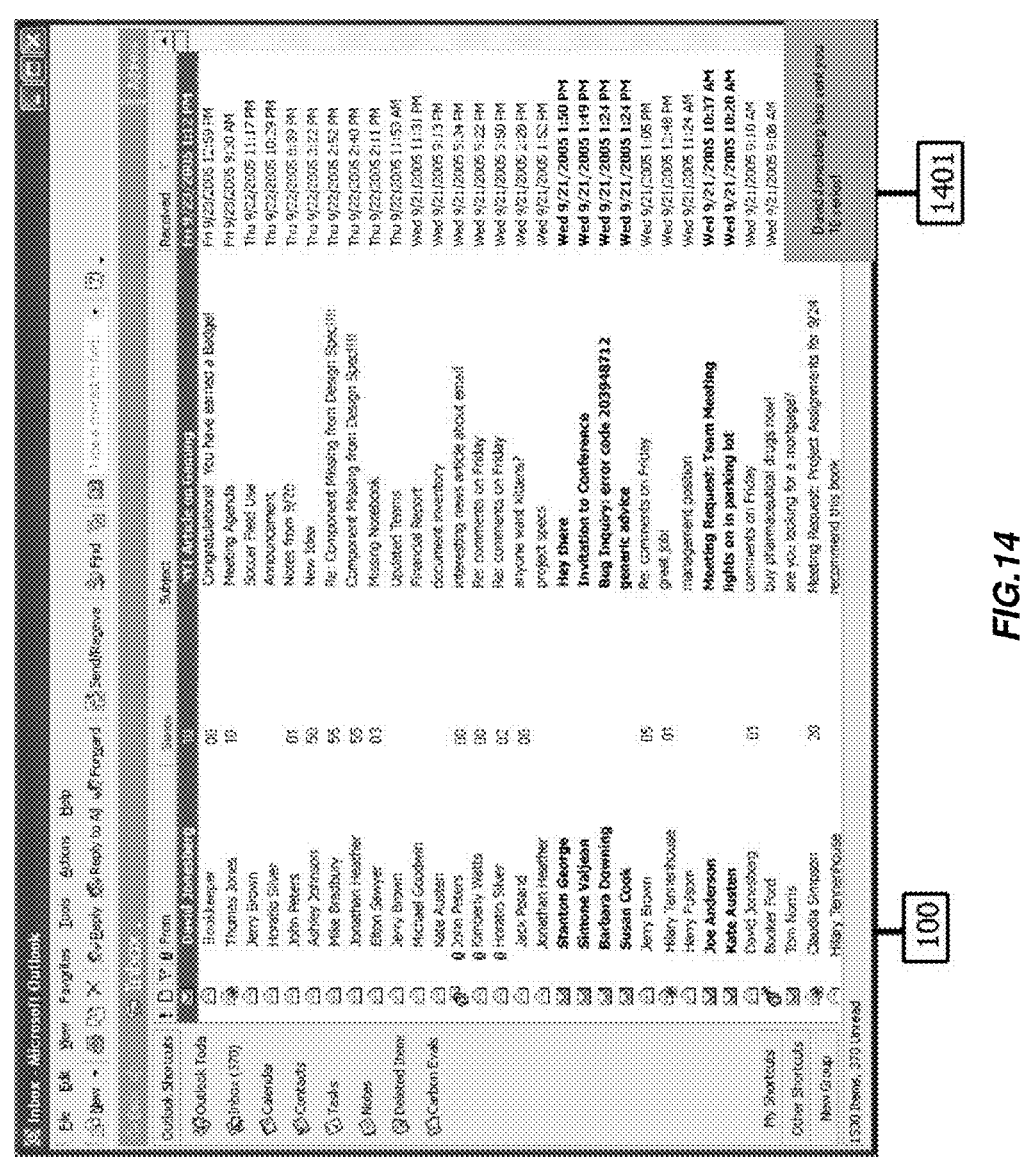

In one embodiment, whenever an individual receives currency units (for example, by having received or read a message that has currency units attached), the recipient of the currency units is alerted as to the transaction. For example, an alert box may appear on the individual's screen, stating "John Smith has sent you 20 Serios". Referring also to FIG. 14, there is shown an example of user interface 100 including alert message 1401 informing recipient 402 that he has received Serios. In one embodiment, individuals can configure their systems so as to specify whether and how to receive such alerts.

Figure 15:
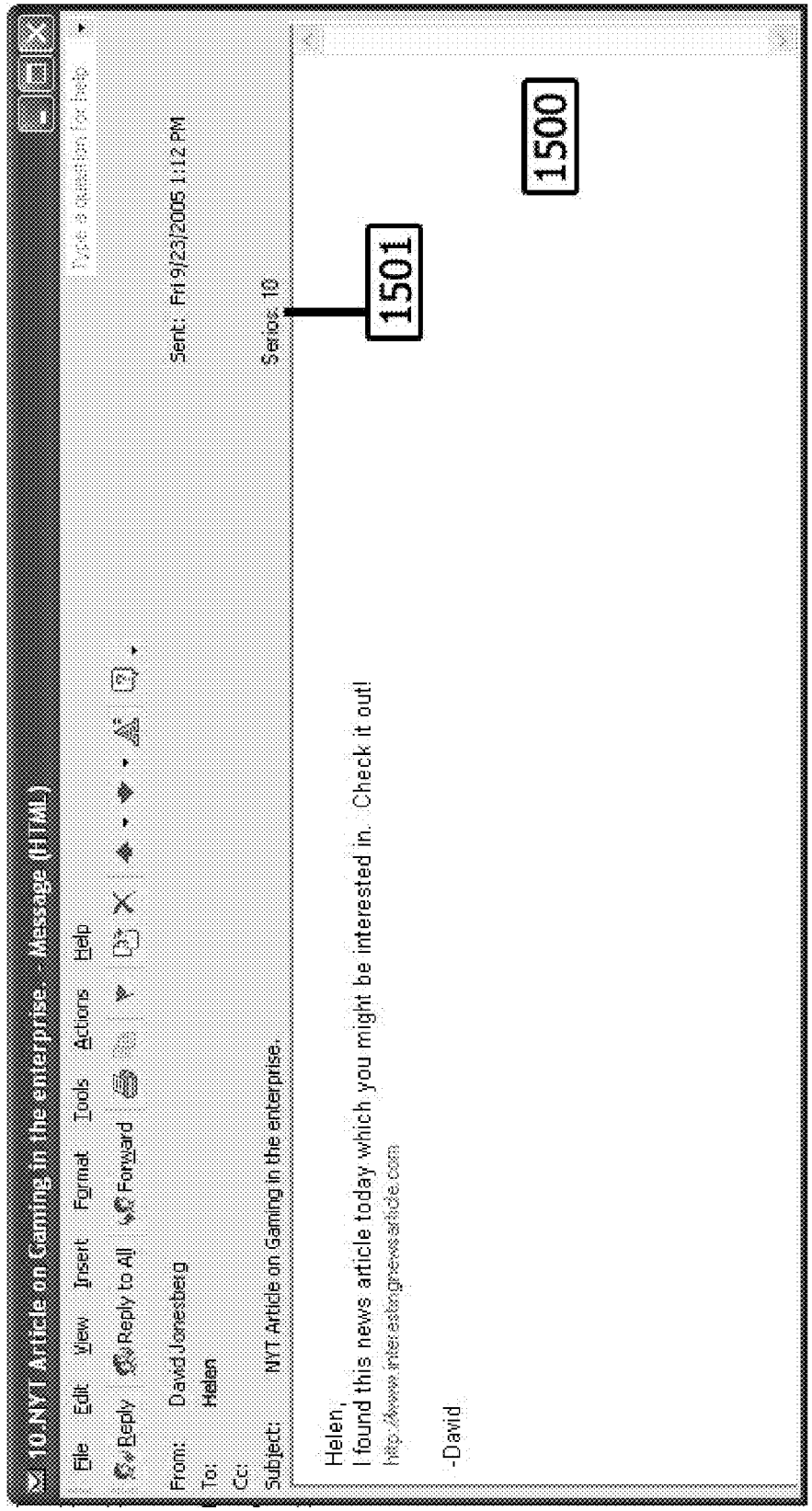
FIG. 15 is a screen shot depicting an example of an email message including an indication of a number of currency units associated with the message.

In one embodiment, when recipient 402 opens or views an e-mail message that includes currency units, the number of currency units is displayed in or alongside the window containing the e-mail message. Referring also to FIG. 15, there is shown an e-mail message display window 1500 including an indication of the number of currency units 1501 allocated to the e-mail message.

Referring again to FIG. 4, there is shown a message trace for the process of sending a message from a sender 401 to a recipient 402 in one embodiment. When sender 401 indicates that an email message is to be sent, e-mail client 403 sends the appropriate information to e-mail Server 405 (arrow #1). In one embodiment, one copy of the electronic message containing a set of information is forwarded by e-mail server 405 to bookkeeper 406 (arrow #2) while the original is forwarded to the e-mail client 404 of recipient 402 (arrow #3). The copy of the message sent to bookkeeper 406 may or may not include the content or body or subject line of the e-mail message (e.g., it may be a header only). In one embodiment, only the requisite information for Bookkeeper 406 functions is sent to bookkeeper 406: namely, the number of currency units being exchanged, and the source and destination of the currency units, and optionally security information, such as hash, signature, or other authentication token. Communications may take place over a secure data channel, and/or the message body or other e-mail data may be encrypted, to facilitate transfer for bookkeeper 406 functions while protecting privacy. The transaction data is sent to repository 408 by bookkeeper 406 (arrow #4), where the account information for all parties is updated in the database, and sent back to bookkeeper 406 (arrow #5). Bookkeeper 406 routes a message to the e-mail client 403 of sender 401 (arrow #6) and to the e-mail client 404 of recipient 402 (arrow #7). The account information for each party is updated within their respective clients 403, 404. These additional messages may be displayed or they may be hidden from the users.

Desktop Application

In one embodiment, a desktop software application can exist to facilitate communication between clients 403, 404 and bookkeeper 406. The desktop application can be downloaded and installed separately from clients 403, 404, or it can be bundled with clients 403, 404. Its core functionality is to serve as a bridge between any client application 403, 404 (including such things as, but not limited to, e-mail clients, instant messaging clients, voice over IP software, collaboration software, telephone) and bookkeeper 406. For illustrative purposes, the desktop application is described herein as it would interface with an existing messaging or publishing client 403, 404 such as Microsoft Outlook, LotusNotes, Netmail, Thunderbird, wiki, website, etc. and the like. It is also possible that the desktop application can communicate directly with other desktop applications running on another user's machine. In one embodiment, the desktop application may send information about currency units associated with a particular message and it may also collect and forward information regarding messages sent without currency and other information about messaging behavior such as response time to reply. Any of the functionality of the desktop application can alternatively be provided by a server on a website, with the desktop application providing access to the website server. Alternatively, the desktop functionality can be provided by software on a PDA or other computing device. The desktop application can be set to automatically launch when a user opens his or her e-mail client 403, 404 or associated clients.

Figure 5:
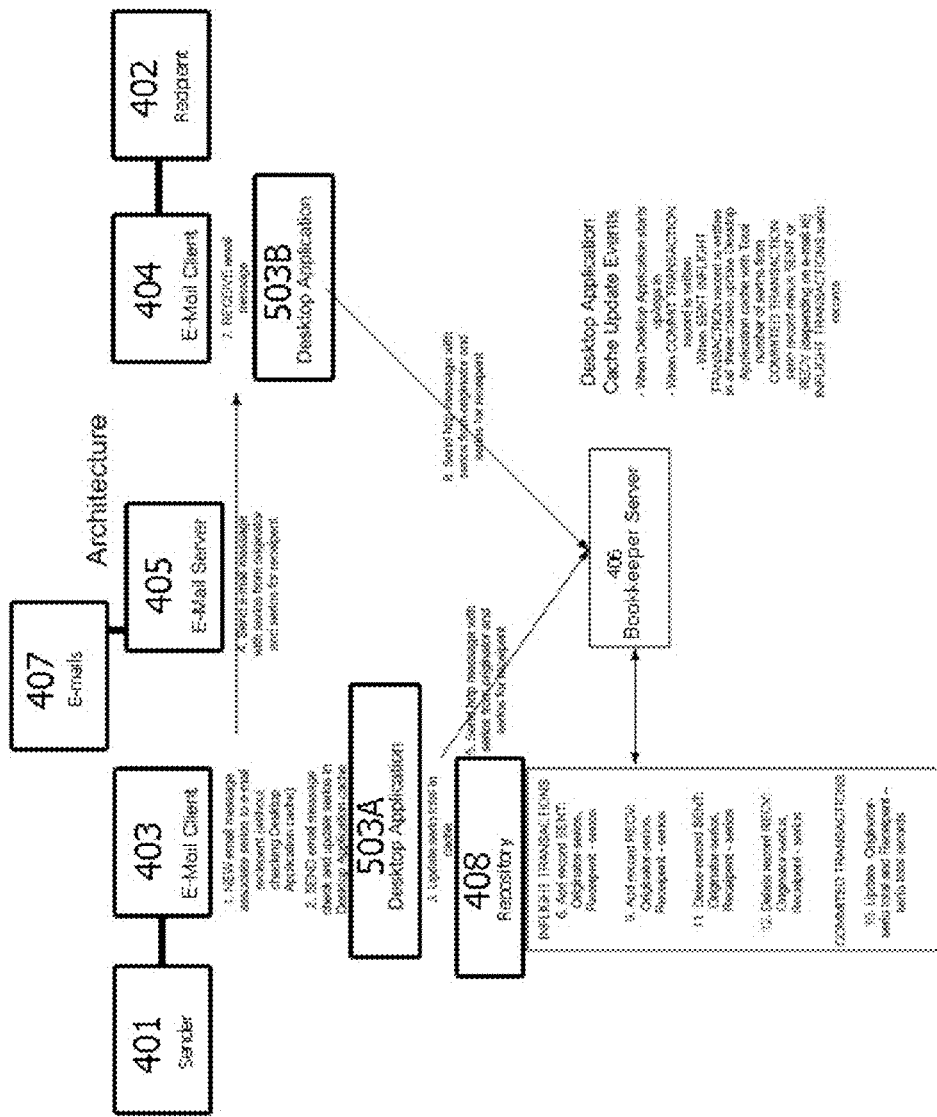
FIG. 5 is a block diagram depicting message flow architecture according to one embodiment of the present invention.

FIG. 5 illustrates an embodiment of message flow for a desktop-based implementation. Each numbered item in this description corresponds with the number labeled in FIG. 5:

1. The E-mail client 403 sends an e-mail message to e-mail server 405. An appropriate number of currency units are associated with the e-mail message.

2. The E-mail client 403 notifies separate desktop application 503A running at sender's 401 machine of the number of currency units (Serios) to be increased or decreased, and to whom the currency is to be delivered. Desktop application 503A keeps a local copy of the total currency balance for the user.

3. Desktop application 503A sends an encrypted message to bookkeeper 406 instructing bookkeeper 406 to update repository 408 accordingly.

4. Bookkeeper 406 keeps the message in a queue waiting for a corresponding message to arrive from recipient's 402 desktop application 503B.

5. When both messages have arrived, bookkeeper 406 updates repository 408 for sender 401 and recipient 402. This includes adding SENT and RECEIVED records, updating the number of currency units for sender 401 and recipient 402, and deleting the pending transaction. In an alternative embodiment, only one of the two messages is needed before an update proceeds.

6. Bookkeeper 406 retrieves the new total number of currency units for each user from repository 408 and sends an encrypted message via an e-mail protocol or other message type to the recipients' 402 desktop application 503B. Bookkeeper 406 may communicate via messages with each of the desktop applications 503A, B as needed to maintain accuracy and/or synchronization. When selected by the user, users may see an optional pop-up box that notifies them of a change in their account balance.

7. When the next e-mail is created by sender 401, client 403 checks desktop application 503A to make sure there are enough currency units available to perform the selected transfer.

This embodiment can be built such that other users may utilize application programming interface (APIs) and software development kits (SDKs) to develop additional software modifications on top of desktop applications 503A, 503B to enhance the user experience, skill set, or performance. As a primary feature of the invention, a platform of tools and code will give other users the building blocks on which to program their own add-ons, analysis tools, and integration pieces to enable currency exchange on applications. These modifications could include simple alterations, such as a way to change the client's user interface via a "skin," or something more complex, such as integration of attention economy currency with an external auction market like eBay.

E-Mail Server

In one embodiment, e-mail server 405 is implemented using a common e-mail server product such as Microsoft Exchange or Lotus Domino. It has the capability to deal with different e-mail protocols, such as POP and IMAP, for example. E-mail server 405 may reside within the organization's firewall or be located externally but still be able to communicate effectively for performing requisite tasks. If server 405 is located outside the organization's internal network, special measures can be taken to protect the content of organization-specific e-mail to ensure compliance with security standards. In order to facilitate communication with or independent of email server products, the invention provides for assignment of currency and its recognition via web-based interfaces such as webmail.

Figure 8:
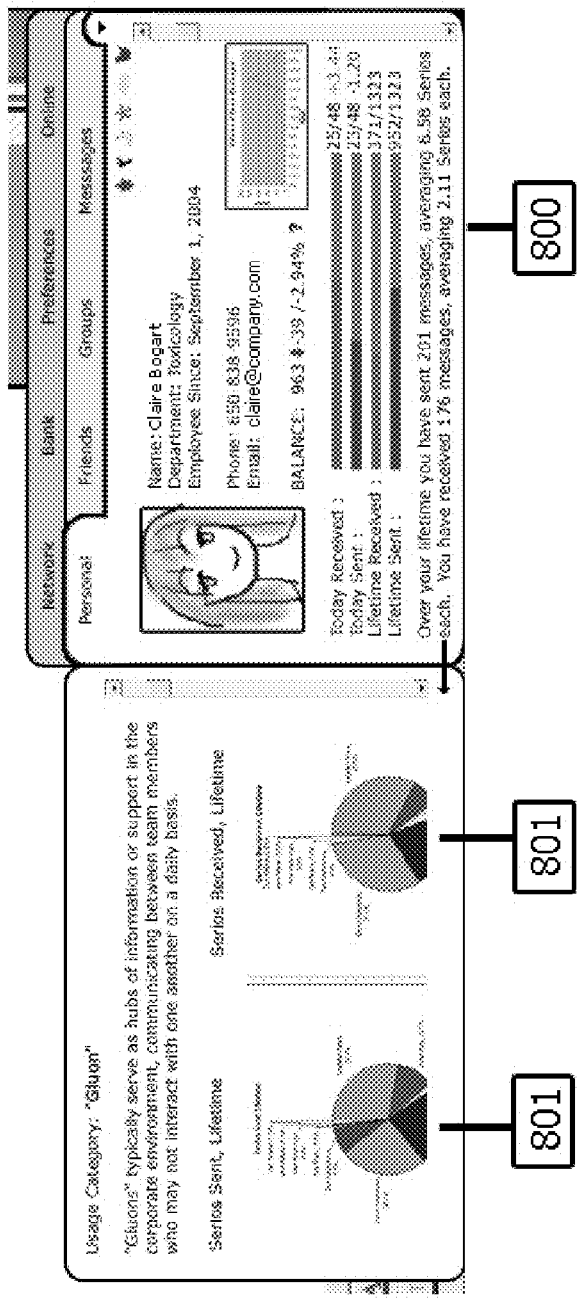
FIG. 8 is a screen shot depicting an example of a user interface for presenting account information for a single user according to one embodiment of the present invention.

In one embodiment, desktop applications 503A, 503B can also provide information regarding users' currency accounts. Referring now to FIG. 8, there is shown a screen shot illustrating an example of a display showing such information. This user interface includes account information for a particular individual, including (but not limited to) currency exchange, balances, analysis of currency trades (amount sent and received "today," over a partial or set period of time, and "lifetime"), and personal information, as well as deeper analysis of a user's role or behavior based on currency usage (such as pie charts 801).

Figure 10:
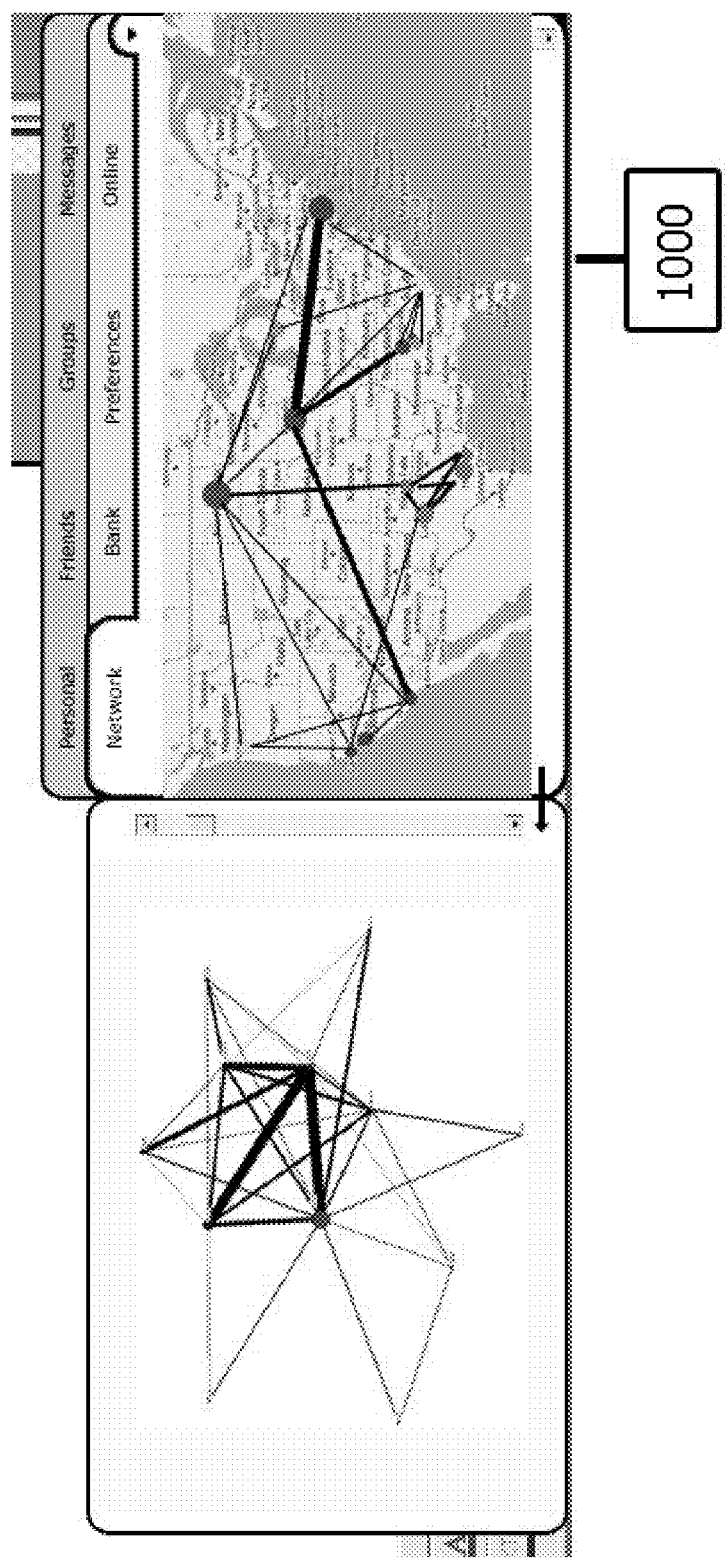
FIG. 10 is a screen shot depicting an example of a graphical representation of communication and behavior patterns based on currency exchange data, according to one embodiment.

Additional information and reports can also be provided. For example, FIG. 10 illustrates an example of a graphical representation 1000 of communication and behavior patterns based on currency, according to one embodiment.

Desktop application 503 can perform such functions as maintaining a local cache of the total currency account balance per user and providing communication with the e-mail client 403, 404 to determine how many currency units are available for outgoing e-mail messages. Information in the desktop application can be represented in a variety of textual, graphical, and interactive ways that ultimately reflect a user's account status or balance, as well as serve as a communication hub between the user and other members using the invention.

Figure 9:
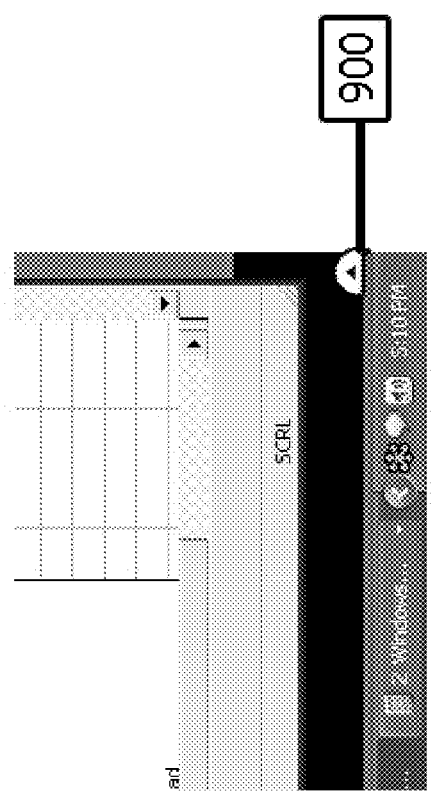
FIG. 9 is a screen shot depicting an example of a user interface including a representation of a minimized application for managing currency units.
Figure 17:
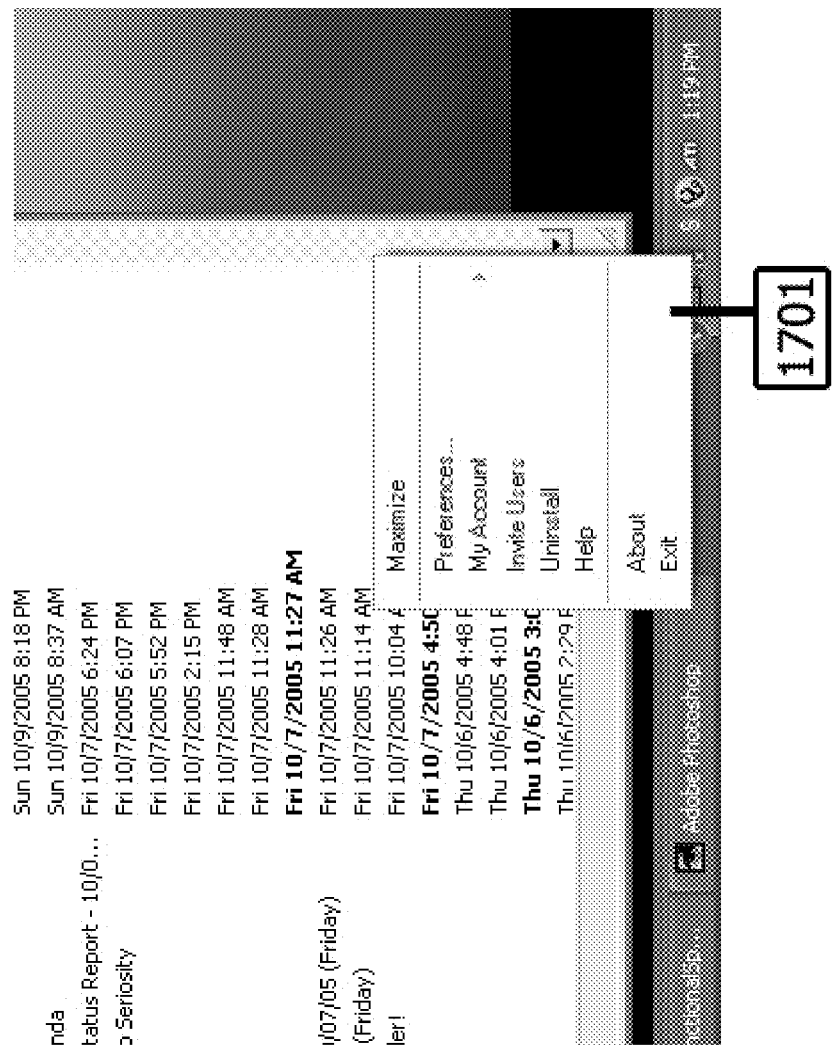
FIG. 17 is a screen shot depicting an example of a menu for accessing functions of a desktop application for managing currency units.

Desktop application 503 can be accessed, for example via the Windows taskbar or system tray for Windows operating system users. Referring now to FIG. 9, there is shown an example of minimized icon 900 for the desktop application 503, as may be displayed on a screen in the Microsoft Windows operating system. Referring also to FIG. 17, there is shown an example of menu 1701 that appears when the user clicks on minimized icon 900. Menu 1701 provides access to various functions and commands associated with desktop application 503.

Bookkeeper 406

In one embodiment, bookkeeper 406 is implemented as a server for handling currency transactions. Accordingly, bookkeeper 406 updates repository 408 in accordance with e-mails it receives from users' e-mail clients 403. It extracts the relevant information from incoming e-mail messages, including who sent how many units to whom, and at what time, and the like. It records this information in repository 408. In one embodiment, repository 408 is implemented as a database containing transactions and balances. In one embodiment, bookkeeper 406 also updates and maintains a web-accessible version of repository 408, which allows users to access their balances, transaction histories, and view data on other users' activities. From here, a user can compare his or her own activities to others, or he/she can look up information about an individual, a team, or a project of interest. In this capacity, bookkeeper 406, or a separate application using data collected by bookkeeper 406, performs certain analyses on the data it collects, and makes the results of those analyses available to users. Some of these data analyses can include account balance summaries, number of messages sent and received (volume), number of messages sent between specific individuals or groups (balance of trade), the number of messages without currency attached sent over a period of time, the highest amount of units given to or received from a certain individual, etc.

In one embodiment, bookkeeper 406 includes administration functions that allow the authentication, registration, modification, and deletion of users. In one embodiment, bookkeeper's 406 responsibilities regarding the addition of a user consists of creating a new entry in the repository, updating it to include currency given to new users (if any), and sending out an invitation e-mail to that user. Deleting a user consists of a notification or confirmation e-mail being sent, as well as making the necessary changes to repository 408.

In one embodiment related to the registration and creation of user accounts, it is possible for users to associate one or more messaging accounts with one or more currency accounts, where each currency account can be used for different purposes with features toggled on or off, and can be accessed via different media. For example, a person could create an Account A that allows currency exchange via devices like instant messenger, voice over IP, and on a mobile phone, while Account B is only enabled to exchange currency over email and webmail clients.

Bookkeeper 406 may reside within an organization's firewall or be located externally, but still be able to communicate effectively for performing requisite tasks. Bookkeeper 406 may communicate directly with desktop applications 503A, 503B to facilitate information transactions between the clients 403, 404 and bookkeeper 406, or bookkeeper 406 may communicate directly with clients 403, 404.

Repository

In one embodiment, repository 408 is a database that contains records of all users, and their transactions within the system. It includes user information, such as name, e-mail, and account number, as well as information about each transaction that has occurred in the system. Bookkeeper 406 has access to repository 408 so that it can process user transactions. As above, various embodiments provide for an interface that allows users to view information stored in repository 408. In one embodiment, repository 408 is accessed by a web interface that allows a user to view his or her currency balance, transactions, and statistical data aggregated by bookkeeper 406. Optionally, a user interface is provided to enable a user to see his or her currency balance in relation to and relative standing with others, such as across the entire enterprise, within their department, or with respect to any other corporate designation or organizational framework. For certain users (e.g., administrators, managers, executives), reporting information such as currency usage patterns (e.g., currency usage by department, team, individual, project, etc.), trends (currency usage over time), and the like are provided using database and statistical reporting tools. Repository 408 may reside within the organization's firewall or be located externally, but still be able to communicate effectively for performing requisite tasks.

Additional Features and Variations

One skilled in the art will recognize that the above description sets forth an exemplary embodiment of the present invention, and that many variations and/or additional features can be provided without departing from the essential characteristics of the invention. The following features and variations are intended to serve as examples for illustrative purposes, and are not intended to limit the scope of the described invention. One skilled in the art will further recognize that any or all of the variations and features discussed herein, and other variations and features, may be implemented either alone or in any combination with one another.

Distribution of Currency Units

Allowances of currency can be disbursed equally to all participants in defined intervals, or the allowances can be proportional to specific criteria, such as the participant's department, job title, rank, seniority, salary, or earned via attendance, invested time, performance of tasks, service, support, behavior, and the like. For example, only high level managers of a company might initially be given currency units, which they can then use to reward subordinates. Alternatively, it is possible for no regular allowances to exist, but rather that all participants are given a set number of units upon initiation of the system (and/or upon joining the organization) and can earn additional units through transactions with others. For example, this could be a currency unit in the closed economy for an enterprise, a community of people, or school.

Currency Exchanges within and across Social Groups, Institutions and Enterprise

In one embodiment of the invention, the mechanisms and methods used to support exchange of coworkers within an enterprise are adapted and utilized for the exchange of currency between users in different enterprises, institutions, government agencies, social or political groups, or other communities of interest. In these embodiments, multiple Bookkeepers may be used to distribute the functionality of maintaining user balances, distributing and redeeming the currency units. Likewise one or more Central Banks may be used to coordinates the activities of bookkeepers, as well as for account management, and clearinghouse functions for settling large number of currency exchanges between enterprises, for example along the lines of the operations of the Automated Clearing House (ACH) operated by the Federal Reserve, or similar clearinghouse mechanisms (e.g., SWIFT).

One Currency vs. Multiple Measures

In one embodiment, users use one common currency for all exchanges within the organization. In another embodiment, multiple measures and/or currencies exist, such as a single currency and additional rating systems. These additional rating systems can be based on a numerical scale, give people ranks or titles, allow peer awarding of non-exchangeable tokens, or be a separate currency. Each measurement can be used to assign value to different resources and performance. For example, it is possible to use one currency to purchase attention, equipment time, and vacation time, while a different rating system is used to rate others on performance, information, value, and to serve as an indicator of feedback. In another embodiment, a separate currency may exist for usage by a particular group of people or for a particular focus. However, this currency may also be traded for attention resources, either directly or by exchanging it into Serios. For example, a currency may be created specifically for users of amazon.com, a large online shopping portal. This currency can be earned each time a user accesses or purchases from the site. It may also be used implicitly to purchase attention because they themselves carry value, or they may be traded for Serios via an established exchange rate.

Sources, Pools, and Drains

The system of the present invention can lead to various currency sources, pools, and drains that can be manipulated to affect the economy in various ways, such as to curb inflation or promote growth. These can be designed to drive performance and behavior desired by the organization. Sources are the means by which currency units are injected into circulation, and may include a regular allowance or payment for successful completion of a task, project, or activity. Pools describe currency in circulation, including savings, investments, loans, inventories, rented goods, and the like. Drains are the various means by which currency exits from circulation, and may occur via transactions to obtain benefits provided by the organization. For example an employee may spend 100 currency units to purchase lunch with the CEO, or bid in an auction for a digital music player, and the currency thus exchanged is removed from circulation. Taxes levied on exchanges of currency or on balances held can also serve as a drain.

Central Bank

In one embodiment, a Central Bank serves as a repository of currency that is removed from circulation. The Central Bank can serve many typical banking functions to stabilize the economy, such as injecting currency into or retracting currency from the currency supply. The existence of a Central Bank may also facilitate additional features such as reference interest rates for borrowing.

Central Planning and Price Controls vs. Free Market

In one embodiment, increased control is given to the operators of the system so they can guide the direction of the economy. They may offer incentives for certain behavior and create blocks or limits or extra cost for behavior they deem undesirable. In an alternate, free market embodiment, a great amount of freedom is given to each individual with respect to where he or she can spend currency and what prices he or she will pay. In this system, the interaction between self-interested buyers and sellers is relied upon to regulate interactions in a way that may be favorable to the organization as a whole.

Taxes

In one embodiment, additional fees, maintenance costs, or taxes may be imposed to encourage or discourage various behaviors. For example, taxes on "wealth" may be used to discourage hoarding of currency. Taxes or fees may be charged for sending too many low-cost emails in an attempt to discourage e-mail volume.

Who Keeps Currency

In one embodiment, e-mail recipients 402 keep the currency units that are attached to messages they receive. This enables the recipients 402 to accumulate a balance of currency units, and spend it as they see fit. In an alternative embodiment, recipient 402 does not get credited with those units to his or her account, but rather the units are subtracted from sender 401 and stored in bookkeeper 406, the Central Bank, or some other repository. Recipient 402 may nevertheless choose to return all, some, or even more of those units back to sender 401 from the repository. This design choice allows individuals to send feedback in the currency without attaching a personal cost.

Reevaluation of Currency

The described invention provides unprecedented liquidity and transparency to interpersonal transactions. One beneficial effect of creating an explicit economy for the resources within an organization is that it generates discussion among users regarding values and priorities. When the economy is initiated, individuals will try to determine how to act within the new framework. This is a positive effect, since it amounts to a collective assessment and calibration of the organization's assets. In one alternate embodiment, a mechanism is provided by which one or more properties of the system are changed or rotated on a periodic basis to recreate the effects which are typical to the new introduction of the system.

Filters

In one embodiment, client 403, 404 is adapted to allow users to set filters for specific criteria for handling messages. For example, client 403, 404 enables users to automatically filter out any message (e-mail, instant message, or voice call) where the number of attached currency units is less than an arbitrary number of currency units. Additionally, client 403, 404 can be configured to route and store messages into folders based on their attached currency value (e.g., to route some messages to a "High Value" folder for immediate review), as well as to forward, as to a mobile device or PDA or assistant, delete, or otherwise perform any e-mail based action conditioned upon currency value.

Task-Based Resource Allocation

In one embodiment, currency expenditure can be applied to many resources within an organization. Units of currency can be earned from others or from bookkeeper 406 or Central Bank by performing desired work tasks and activities. Currency can be spent to purchase or use resources such as the attention or time of other individuals, equipment, data, services, and space. For example, currency may be offered for attendance at meetings, if an individual attends a helpful training class, or if a person passes a qualification test. Earning and spending currency may not be limited to circulation within a single organization, but may tie to outside organizations such as vendors, customers, channel partners and relate to goods, services, information, and content.

Reputation and Badges

In one embodiment of the invention, users may be rewarded for currency usage via system attribution, purchase tokens of recognition for others, and purchase tokens for display purposes. These rewards, or badges, are visible, persistent indicators of achievement and prestige among the community of users. The badges may be automatically awarded or assigned at certain time intervals or by the system after a user achieves some sort of usage milestone. For example, someone who has both sent and received 100,000 Serios over their lifetime may earn the "Grandmaster Badge."

In addition, badges may be purchased by individuals to give to other individuals as a reward or feedback indicator. In this case, the giver of the badge is also of importance. For example, if the CEO of the company purchases a "Project Leader Badge" for a junior associate, it contains a great deal of information to anyone who views it. Finally, certain badges may be for display only, and can be earned or purchased to convey information only. For example, an individual may choose to purchase a "Golden Retriever Badge" to display on a personal profile for visual purposes, to express to others that they like dogs, or just for fun.

User-Determined Rewards

Users can take advantage of the flexibility of this system to reward currency units to others for desired behavior. In particular, users can define currency reward functions to attach to their messages. These functions provide a varying amount of currency to one or more recipients 402 based on variously defined response or action criteria. For example, users can create incentives to managers, peers, or subordinates for responding to time-sensitive requests by offering a specified currency reward function, such that if recipient 402(s) reply within in two hours they receive X units of currency, but if they reply within one hour they receive 2× units. Similarly, a sender 401 may choose to reward only the first responder, the best problem solver, or someone with the most useful information with bonus amount of currency. The Bookkeeper 406 administrator can keep track of these currency reward functions and any other private treaty exchanges. Client 403, 404 in this embodiment is adapted to provide a user interface by which the user can define the currency reward function, e.g., using menus and fields, or via a programmatic interface.

User-Created Markets

In one embodiment, the present invention is used for purchasing attention in connection with web-based content. Users can create personalized revenue-driven web pages, blogs, or other content stations that peers and colleagues may access. Individuals may host or provide personally created content, and charge a currency fee for access to said content if they desire. In addition, individuals may post tasks or projects and allow other users to bid on opportunities with currency. In this way, individuals may buy and sell goods, services, and information to earn revenue.

Visibility and Transparency

In one embodiment, the transactions and balances of all users are made publicly viewable. This data can be used to measure progress and performance, and reflect reputation. Similarly, it can be possible to make only certain transaction and balance information transparent. In another embodiment, any or all of such information is hidden from users.

Workflow Management

In another aspect of the invention, the artificial currency is used as a mechanism to enhance workflow management systems. Typically workflow management systems are used to assign tasks to individuals and groups, and monitor and report on the execution and status of such tasks. Tasks are typically associated with priority values by the system or other users (e.g., managers). An embodiment of the present invention enhances a workflow management system by configuring and adapting the workflow management system to include with a task a number of currency units by which the task is valued for execution. This enables the first user to decide the levels of incentive appropriate for task completion by another user. Thus, tasks that are considered important by a manager, can be assigned with a significant number of currency units. The currency units can be assigned for different levels of task completion (e.g., N currency units for completion of some M percentage or steps of a task or project). The Bookkeeper 406 exports an interface by which the workflow management system can notify it of task completion or status so as the enable bookkeeper 406 to update users' accounts based on task status and performance.

The provision of currency integration with workflow management can be further extended to interoperation with system or machine based tasks. Thus, in one embodiment, the artificial currency can be attached to tasks assigned by a user to a machine or system. For example, a system operator can attach some number of currency units to a task to be executed by a computer system (e.g., a database operation, a code compilation task, a manufacturing task), by a manufacturing system (e.g., a milling operation, a chemical conversion process, or a robotic operation), or the like. Here the receptive system is configured and adapted to schedule and prioritize a task execution queue based at least in part on the number of currency units associated with each of its tasks. Furthermore, the artificial currency can be attached to tasks assigned by one machine or system to a user, or assigned by one machine (or system) to another machine (or system). These various approaches provide a unified environment in which users and machines utilize a common currency to determine the significance and importance of tasks and provide feedback for either human or machine learning for optimization. In these approaches, the various currency-enabled machines and systems have access to one or more bookkeepers by which they can report the amounts of currency received for tasks, or required for assignment of tasks.

Anonymity and Non-Intrusion

In one embodiment, certain transactions may be allowed in which sender 401 remains anonymous to recipient 402 and/or the community. This feature may be enabled to permit feedback which would be uncoupled or protected from explicit or implicit quid pro quo arrangements or abuse of a supervisor's authority to extract currency from subordinates. In another embodiment, anonymity may be "purchased" at some cost to sender 401 for a specific transaction.

A correlate of anonymity is non-intrusion, by which a recipient 402 does not need to use any attention in order to receive some number of units of artificial currency from another. In other words, a sender 401 may give or grant another user a number of units of currency, without recipient 402 being notified in a manner that consumes that recipient's 402 attention. Instead, the granted currency units can be automatically added to the recipient's 402 balance. One implementation of this feature is provided by the use of special "bookkeeping" messages to bookkeeper 406. These bookkeeping messages are sent directly to bookkeeper 406 (or a delegate), and identify a transaction type (e.g., deposit), an amount (e.g., 100 Serios), a source account (e.g., sender 401) and a target account (e.g., recipient 402). Additional flags or parameters can be established for the message, such as whether or not to notify recipient 402 of the transaction, whether the transaction is anonymous (e.g., not disclosing sender 401), or delaying the transaction to a specified date or event. An implementation of the bookkeeping messages can be provided by a user interface including buttons and/menus for defining the transaction characteristic and parameters described above. Alternatively, the transaction can be defined using a command or message language (e.g., name-value pairs).

Document Access Fee

In one embodiment, access to documents in the organization costs the user a document access fee in units of the currency. In one embodiment, the amount of this fee is small enough not to be a barrier to access. In another embodiment, pricing is established via a continuous auction for information access. The original author(s) of the document receives all or a portion of that fee. Thus the incentive is to write valuable documents that are accessed by many individuals. Conversely, users are able to quickly and easily see and rank documents in order of the times they have been accessed, which can help them quickly determine the most valuable documents for particular needs. In this embodiment, bookkeeper 406 cooperates with a document management system that stores and retrieves the documents. The document management system includes document profiles for each document, which can include a field that can store a currency amount (the field can be left empty of the document is considered to be free). The Bookkeeper 406 provides an interface by which the document management system can notify it of document accesses so as to update the account balance of an accessing user for payment of the document access fee.

Engineered or Emergent Behavior

It is possible to design the system to drive specific behaviors, or to allow users to define their own behavior. For example, in one embodiment it is conceivable that participants can click a "Complaint" button to report someone who is disagreeable and difficult to work with. Because this feature is programmed into the functionality of the system, it polices disruptive behavior. In an alternative embodiment that exemplifies emergent behavior, no "Complaint" button exists, but the participants may socially mark that individual as troublesome, and give him or her low feedback or refuse to exchange currency units with them.

Collaborative Metrics

In one embodiment, the raw data from worker-to-worker currency exchanges can be displayed as a dynamic, multi-dimensional, multi-directional graph of collaborative activity. The graph can display each worker as a node in a network, with the proximity of nodes and strength of ties between nodes determined by the frequency and amount of units exchanged. The raw data for network determination will be the worker-by-worker account matrix, where cell entries represent exchanges for all possible pairs of workers. Clusters of collaborative groups, based on empirical data related to actual communicative activity rather than formally assigned groups, can be represented graphically with use of color coding and visual clustering techniques. The graph can change over time in increments and will constitute a dynamic representation of collaborative activity based on perceived value of information exchanges. The network activity graphs can be produced for selected groups within the larger economy or for special subgroups determined by game masters or the workers themselves. Collaborative clusters, and their structural changes over time, are readily apparent and can be used to reinforce or redirect organizational assets. In addition, the information from graphical representation of collaboration can be used to design and engineer entertaining activities, games, scenarios, and/or narratives to drive specific behavior or performance patterns.

Alternative Enterprises, Organizations and Groups

In addition to enterprises such as business corporations, the present invention could provide benefits for collaboration among participants in government and non-profit organizations, educational institutions, informal clubs and associations, families, and military or civilian command-and-control structures. The present invention will benefit circumstances where there is time urgency for attention to messages, changes in priorities, feedback delivery, and team coordination. In one embodiment, a single common currency is managed to provide stable and predictable unit of exchange to users across a variety of enterprises, organizations, and groups. In an alternative embodiment, multiple currencies are managed and a mechanism for currency exchange is provided.

Team Activities and Economic Behavior

In one embodiment, the present invention further includes tools, mechanisms, and incentives that allow people to work together cooperatively and receive team rewards. Users may pool resources to achieve certain goals, or share in and mete out the rewards. Group activities may involve a variant set of tools and recordings to support multiple users. In one embodiment, individual interests in the currency may be aggregated to form corporations with defined ownership interests and the right to earn and pay currency. In this embodiment, bookkeeper 406 is adapted to enable user to set up pooled accounts, currency distribution, and resource pricing functions.

Feedback on Multiple Time Scales

In one embodiment, the system of the present invention provides feedback to users on multiple time scale loops to reinforce desired behavior and discourage undesired behavior. These time scales can range from very fast, immediate feedback recurring every few seconds, to extremely long feedback cycles that take months or even years. Feedback serves to reinforce and drive desired behavior, and can deliver to participants assets that enrich or empower their user experience.

Medium of Exchange

In one embodiment, credit cards, money orders, stored value cards, checks, and/or other money management tools are issued in units of the artificial currency, in order to facilitate exchange of currency units by participants.

Users can exchange currency units by means of electronic devices other than a computer or through a local area network. In one extension, a portable version of bookkeeper 406 software allows real time wireless transactions between individuals who are using handheld devices, cell phones, audio devices, and other portable electronics. Communication may be based on peer-to-peer architecture rather than through a central server. Encryption can be used in the transfer and store of currency.

Credit

In some embodiments, users are permitted to borrow units of currency from each other, via private transactions, or from bookkeeper 406 or Central Bank. Provision for interest and enforcement of default are enabled in the Central Bank.

Stock Markets

In one embodiment, currency may also be used by individuals in an internal futures market, where individuals may trade currency for shares of stock representing future performance of organization products, services, or resources. The currency may also be exchanged directly with official, established currency such as the United States dollar or the Chinese ren min bi. A mechanism for exchanging such currency may be built into the administrative functions of bookkeeper 406, or exist in an adjacent or compatible way with the Bookkeeping system.

Internal Social Networks

In one embodiment, the currency stream can form the backbone for an internal social networking website or application. The website or application can have such features as, but not limited to, the ability to create a personal profile, link to friends, view other users' profiles, leave messages, form groups, schedule events, view a network visualization of who you are linked to, post pictures, search for users, create blogs, instant message, contact one another, or find individuals inside or outside the organization with certain skill sets, experiences, backgrounds, interests, etc. Communication and incentive structures are based largely upon currency usage. For example, a user may be able to earn access to certain groups based on a positive currency trade balance.

External Social Networks

In one embodiment, external social networking websites and applications may integrate currency data into existing features, or use attention currency to drive behavior or accomplish certain goals. More advanced attention economy exchange capabilities and analysis can be enabled by integrating the currency into the regular tools and activities available on these external websites and applications.

Currency-Driven Personality or Behavior Profiling

Data about individual transactions in the economy may be used to determine personalities of the users. This information may be reported to the users as feedback about their exchanges and their role in a network and, if agreed to by the participants, it may be reported to third parties (e.g., management, organizational researchers, human resources) as information that identifies how the individual contributes to the organization. The data may be reported numerically (scores on personality dimensions), categorically (naming which of several personality descriptors apply) or pictorially, including facial expressions that depict different personalities or other icons and objects that represent different personality categories.

Personality is defined according to the social psychological literature about dimensions or factors that constitute the basic traits of social interaction. One collection of traits is known in social psychology as the "Big 5" and includes extra-version, agreeableness, conscientiousness, neuroticism, and openness. Accordingly, in one embodiment, bookkeeper 406 is adapted to tabulate and monitor currency exchanges in relation to the definition of each personality category. For example, extraversion is characterized by a willingness to initiate an interaction. Introversion, the opposite value on this dimension, is characterized by a greater frequency of responses to interactions initiated by others. In this embodiment bookkeeper 406 tabulates a ratio of the number of times currency exchanges are initiated by the user in relation to exchanges where users are responders to others. The data from this calculation determines the value for the extraversion factor and it may be displayed in numerical or visual forms to users and third parties. A second example is agreeableness. One attribute of this dimension is the amount of negative feedback that an individual gives during an interaction. In this embodiment, an agreeableness factor is be determined by tabulating the number of times users return less currency than they receive in a message thread.

Synthetic Worlds

In one embodiment, the present invention provides elaborated game play, including for example the ability to trade currency for game assets in a virtual world. Workers can select avatars that represent themselves in the economy (e.g., choice of characters, clothing, appearance, and customized accessories), and can then access avatars of other workers (e.g., opportunities for virtual meetings with other avatars, virtual social events, and exploration of virtual spaces where specialized activities occur), and objects that facilitate communication with other team members (e.g., the opportunity to store shared documents and exchange files within the narrative of the virtual world). Benefits of the virtual world and assets accumulated within the world include the ability to increase the level of playful, immersive interaction, to provide feedback and assets that reinforce behavior and empower participants to improve performance, and to offer opportunities for workers to acquire game artifacts that facilitate and increase their ability to acquire currency in the e-mail attention economy (the preferred embodiment).

A companion virtual world can serve as the location for expanded individual game play and collaborative activity via avatars and visual two- and three-dimensional interfaces. The virtual worlds may be customized fantasy narratives (e.g., space travel, medieval feudal fighting, sports competition), or real-world narratives from the actual places where the e-mail attention economy is functioning (e.g., market competition between companies, teams competing within organizations to solve problems). All narratives, regardless of the specific back stories for the interactions, can share the same underlying features and affordances, and will be mapped to a common set of game components, including such ideas as feedback, assets, collaboration, markets, and avatars.

Within the virtual world, game masters may announce quests where participants are offered currency rewards (as well as level and experience recognition) for solving posted problems. The quests can be in-game fantasy adventures (e.g., using the collective expertise of several workers to find or build objects in the virtual world) or they can be real enterprise problems that are solved within a compelling virtual space that offers opportunities for conferencing using personal avatars, sharing assets, communicating, and rewarding workers in relation to their contributions on the quests.

In some embodiments, other features of the virtual world include an auction where workers can post and bid on digital objects in the world, compelling visual displays of game currency including accumulations over time and comparisons to other workers, and a futures market where workers may invest currency gained in the e-mail game in ideas proposed and posted by other workers or the game master.

Conclusion

The present invention provides many advantages that improve efficiency and assist in navigating large amounts of incoming communication and information. The following are some examples of specific advantages provided by the invention.

Too Much Information Becomes Filtered, Relevant Information:

By attributing a cost to certain actions and resources, relative scarcity is enforced. Consequently, individuals are forced to limit consumption and budget personal assets to acquire the things that really matter to them. Some of the expected results include a decrease in the volume of unimportant messages, an increase in valuable communication and feedback, the ability to identify priority items, and better collaboration due to a deeper understanding of team members' priorities.

Meaningless Priority Signals Become Meaningful Priority Signals:

Marking communication with currency that is itself a valuable and scarce resource signifies to recipient 402 that sender 401 has vested interest in the message's delivery and reception. In addition, the currency supports an immediate feedback system because recipients 402 may respond to senders 401 with attached currency.

Organizational Resource Allocation Problem Becomes Accurate Allocation of Resource Value:

Bookkeeper 406 records currency transactions within the organization. The statistical analysis on transaction data can include detailed information on volume and trade balance, thus allowing users, administrators, and other individuals to clearly see how and where they focus energy and attention. When this data is transparent to all users within an organization, it allows users to view and subsequently regulate their own behavior in comparison to others. When currency is being spent on organization resources such as time, tools, space, and data, it is possible to identify areas of high and low value because individual designations are aggregated to determine the price of goods and services. The present invention thus encourages individual preferences to establish a collective consensus via bookkeeper's 406 analysis. With the attention economy, users may quickly and easily set macro and micro views of resource allocation within an organization, and make meaningful conclusions that can help improve productivity and efficiency.

What is claimed is:

1. A method for sending a message with an attention economy currency, comprising:
    at an input device, receiving an indication from a sender of a message specifying a quantity of an attention economy currency to spend;
    at a processor, deducting the specified quantity of the attention economy currency from an attention economy currency account associated with the sender;
    transmitting the message, over an electronic network, to a recipient specified by the sender; and
    at an output device, indicating to the recipient the specified quantity of the attention economy currency.

2. The method of claim 1, further comprising:
    at the processor, crediting the specified quantity to an attention economy currency account associated with the recipient.

3. The method of claim 1, further comprising:
    at the processor, crediting the specified quantity to a central repository of the attention economy currency.

4. The method of claim 1, further comprising:
    at the processor, returning a portion of the deducted attention economy currency to the account associated with the sender.

5. The method of claim 1, wherein the sender specifies the quantity of the attention economy currency from a plurality of available quantities.

6. The method of claim 1, wherein the message comprises an e-mail message.

7. The method of claim 6, wherein the sender specifies the quantity of the attention economy currency to spend by providing input to an e-mail client application.

8. The method of claim 1, wherein the message comprises at least one selected from the group consisting of:
    an SMS message;
    a telephone message;
    a Voice Over Internet Protocol message;
    a fax message;
    a web-based mail message;
    a message board message;
    a forum message;
    an Internet Relay Chat message;
    a website-enabled instant chat message;
    a direct mobile device to mobile device message;
    a direct machine-to-machine message;
    a paper correspondence message;
    a platform or browser enabled message;
    a face-to-face correspondence;
    an interaction within a virtual environment; and
    an interaction within an electronic game, board game, or live action game.

9. The method of claim 1, further comprising sending a message to a bookkeeper via an electronic network; and wherein deducting the specified quantity is performed by the bookkeeper.

10. The method of claim 9, wherein the bookkeeper comprises an automated software process.

11. The method of claim 1, wherein the message is addressed to a group of recipients, and wherein:

deducting the specified quantity comprises deducting the specified quantity for each recipient in the group.

12. The method of claim 1, wherein the attention economy currency is usable for purchasing at least one of resources, items, benefits and perquisites.

13. The method of claim 1, wherein at least one of the sender and the recipient comprises an entity comprising a plurality of individuals.

14. The method of claim 1, wherein at least one of the sender and the recipient comprises an organization comprising a plurality of individuals.

15. A method for sending a message with an attention economy currency, comprising:
   at an input device, receiving an indication from a sender of a message specifying a quantity of an attention economy currency to spend;
   at a processor, determining whether the sender has at least the specified quantity in an account associated with the sender; and
   responsive to the sender having at least the specified quantity:
      at the processor, deducting the specified quantity of the attention economy currency from an attention economy currency account associated with the sender;
      transmitting the message, over an electronic network, to a recipient specified by the sender; and
      at an output device, indicating to the recipient the specified quantity of the attention economy currency.

16. A system for sending a message with an attention economy currency, comprising:
   a first client for receiving sender input for a message, including message content, at least one message recipient, and a quantity of an attention economy currency to spend for at least one recipient;
   a server for routing the message;
   a bookkeeper, communicatively coupled to the server, for deducting the specified quantity of the attention economy currency from an attention economy currency account associated with the sender; and
   a second client, for receiving the message from the server and for displaying the message and an indication of the specified quantity of the attention economy currency.

17. The system of claim 16, wherein:
   the bookkeeper credits the specified quantity to an attention economy currency account associated with the recipient.

18. The system of claim 16, further comprising a central repository of the attention economy currency, and wherein:
   the bookkeeper credits the specified quantity to the central repository.

19. The system of claim 16, wherein:
   the bookkeeper returns a portion of the deducted attention economy currency to the account associated with the sender.

20. The method of claim 16, wherein the received sender input specifies the quantity of the attention economy currency from a plurality of available quantities.

21. The system of claim 16, wherein:
   the message comprises an e-mail message;
   the first client comprises an e-mail client;
   the second client comprises an e-mail client; and
   the server comprises an e-mail server.

22. The system of claim 16, wherein the message comprises at least one selected from the group consisting of:
   an SMS message;
   a telephone message;
   a Voice Over Internet Protocol message;
   a fax message;
   a web-based mail message;
   a message board message;
   a forum message;
   an Internet Relay Chat message;
   a website-enabled instant chat message;
   a direct mobile device to mobile device message;
   a direct machine-to-machine message;
   a paper correspondence message;
   a platform or browser enabled message;
   a face-to-face correspondence;
   an interaction within a virtual environment; and
   an interaction within an electronic game, board game, or live action game.

23. The system of claim 16, wherein the server sends a message to the bookkeeper indicating the quantity of the attention economy currency to be deducted from the attention economy currency account associated with the sender.

24. The system of claim 23, wherein the bookkeeper comprises an automated software process.

25. The system of claim 16, wherein the message is addressed to a group of recipients, and wherein:
   the bookkeeper deducts the specified quantity comprises deducting the specified quantity for each recipient in the group.

26. The system of claim 16, wherein the attention economy currency is usable for purchasing at least one of resources, items, benefits and perquisites.

27. The system of claim 16, wherein at least one of the sender and the recipient comprises an entity comprising a plurality of individuals.

28. The system of claim 16, wherein at least one of the sender and the recipient comprises an organization comprising a plurality of individuals.

29. A computer program product for sending a message with an attention economy currency, comprising:
   a non-transitory computer-readable medium; and
   computer program code, encoded on the medium, for causing a processor to perform the steps of:
      receiving an indication from a sender of a message specifying a quantity of an attention economy currency to spend;
      deducting the specified quantity of the attention economy currency from an attention economy currency account associated with the sender;
      transmitting the message to a recipient specified by the sender; and
      indicating to the recipient the specified quantity of the attention economy currency.

30. The computer program product of claim 29, further comprising computer program code for:
   crediting the specified quantity to an attention economy currency account associated with the recipient.

31. The computer program product of claim 29, further comprising computer program code for:
   crediting the specified quantity to a central repository of the attention economy currency.

32. The computer program product of claim 29, further comprising computer program code for:
   returning a portion of the deducted attention economy currency to the account associated with the sender.

33. The method of claim 29, wherein the indication from the sender specifies the quantity of the attention economy currency from a plurality of available quantities.

34. The computer program product of claim 29, wherein the message comprises an e-mail message.

35. The computer program product of claim 34, wherein the sender specifies the quantity of the attention economy currency to spend by providing input to an e-mail client application.

36. The computer program product of claim 29, wherein the message comprises at least one selected from the group consisting of:
- an SMS message;
- a telephone message;
- a Voice Over Internet Protocol message;
- a fax message;
- a web-based mail message;
- a message board message;
- a forum message;
- an Internet Relay Chat message;
- a website-enabled instant chat message;
- a direct mobile device to mobile device message;
- a direct machine-to-machine message;
- a paper correspondence message;
- a platform or browser enabled message;
- a face-to-face correspondence;
- an interaction within a virtual environment; and
- an interaction within an electronic game, board game, or live action game.

37. The computer program product of claim 29, further comprising computer program code for sending a message to a bookkeeper; and wherein deducting the specified quantity is performed by the bookkeeper.

38. The computer program product of claim 37, wherein the bookkeeper comprises an automated software process.

39. The computer program product of claim 29, wherein the message is addressed to a group of recipients, and wherein:
the computer program code for deducting the specified quantity comprises computer program code for deducting the specified quantity for each recipient in the group.

40. The computer program product of claim 29, wherein the attention economy currency is usable for purchasing at least one of resources, items, benefits and perquisites.

41. The computer program product of claim 29, wherein at least one of the sender and the recipient comprises an entity comprising a plurality of individuals.

42. The computer program product of claim 29, wherein at least one of the sender and the recipient comprises an organization comprising a plurality of individuals.

* * * * *